US012458895B1

(12) United States Patent
Weng

(10) Patent No.: US 12,458,895 B1
(45) Date of Patent: Nov. 4, 2025

(54) PROTECTIVE CASE FOR GAME DEVICE

(71) Applicant: Shenzhen Guangyipeng Technology Co., Ltd., Guangdong (CN)

(72) Inventor: Jie Weng, Guangdong (CN)

(73) Assignee: Shenzhen Guangyipeng Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/037,506

(22) Filed: Jan. 27, 2025

(30) Foreign Application Priority Data

Dec. 12, 2024 (CN) ......................... 202423075745.2
Jan. 21, 2025 (CN) ......................... 202510098858.4

(51) Int. Cl.
*A63F 13/98* (2014.01)
*G06F 1/16* (2006.01)

(52) U.S. Cl.
CPC ............ *A63F 13/98* (2014.09); *G06F 1/1629* (2025.01)

(58) Field of Classification Search
CPC ............................... A63F 13/98; G06F 1/1629
See application file for complete search history.

(56) References Cited

U.S. PATENT DOCUMENTS 8,028,794 B1 * 10/2011 Freeman ................ A45C 11/00 455/575.8
11,121,735 B2 * 9/2021 Kim ..................... H04B 1/3888
11,689,239 B2 * 6/2023 Dannenberg ......... A45C 11/002 455/575.8
12,296,274 B1 * 5/2025 McGlynn ................ A63F 13/98
2012/0071248 A1 * 3/2012 Hovseth .................. A63F 13/92 463/46
2022/0280877 A1 * 9/2022 Baez ....................... G06F 1/163

OTHER PUBLICATIONS

Top 5 Protective Switch Cases—List and Overview + Mumba Case Giveaway by It Came From a Box published to YouTube.com on Feb. 17, 2018 to (https://www.youtube.com/watch?v=dlgEXLdTFns) (Year: 2018).*

* cited by examiner

*Primary Examiner* — Peter J Iannuzzi
(74) *Attorney, Agent, or Firm* — Andrew C. Cheng

(57) ABSTRACT

A protective case for a game device includes a first housing and two second housings. The first housing is configured for accommodating the main body of the game device, and the first housing has two opposite lateral sides along a lateral direction of the first housing. The two second housings are configured for accommodating the two handle controllers respectively, the two second housings are rotatably connected to the two lateral sides of the first housing respectively, and each second housing has a lateral wall on a side away from the first housing. Each second housing is rotatable relative to the first housing between a first position in which the lateral wall of the second housing is engaged with a side edge of a corresponding handle controller; and a second position in which the lateral wall of the second housing is disengaged with the side edge of the corresponding handle controller.

16 Claims, 19 Drawing Sheets

PROTECTIVE CASE FOR GAME DEVICE

CROSS-REFERENCE TO RELATED APPLICATIONS

The present disclosure claims priority of Chinese Patent Application No. 202423075745.2, filed on Dec. 12, 2024, and No. 202510098858.4, filed on Jan. 21, 2025, the entire contents of which are hereby incorporated by reference.

TECHNICAL FIELD

The present disclosure relates to the technical field of game device accessories, and in particular to a protective case for a game device.

BACKGROUND

With the continuous development of technology, the gaming performance of video game devices has been continuously improving, offering users a better gaming experience and gaining increasing popularity among video game enthusiasts.

Some hybrid video game devices may function as both home game devices and portable game devices. These typically consist of a host machine and controllers. Two controllers may be attached to two side of the host machine respectively, allowing the host machine to be lifted when the controllers are held in both hands respectively. When detached from the host machine, the controllers may still be used and maintain signal connection with the host machine via wireless communication.

In order to protect the hybrid video game device with a protective case, the protective case for the hybrid video game device generally includes a back wall and a peripheral wall. The back wall typically fits tightly against the back of the entire game device, and the peripheral wall generally surrounds the outer perimeter of the game device. However, when the game device is fitted with a protective case, the controllers are confined between the host machine and the peripheral wall. When it's necessary to detach the controllers from the host machine, the entire game device must first be removed from the protective case. Subsequently, to continue protecting the host machine, the game device needs to be reinserted into the protective case. Afterwards, when the controllers need to be reattached to the host machine, the host machine must again be removed from the protective case. As a result, with a traditional protective case for the game device, the host machine is required to be detached from the protective case for connecting the controllers and the host machine. This makes the process of connecting the controllers to the host machine cumbersome because of the protective case.

SUMMARY

The main objective of the present disclosure is to provide a protective case for a game device which may solve, or at least partially alleviate the aforementioned problems.

In some embodiments, the present disclosure provides a protective case for the game device. The game device includes a main body and two handle controllers respectively and detachably connected to two sides of the main body. The protective case includes:

- a first housing configured for accommodating the main body of the game device, the first housing having two opposite lateral sides along a lateral direction of the first housing; and
- two second housings configured for accommodating the two handle controllers respectively, the two second housings being rotatably connected to the two lateral sides of the first housing respectively, each second housing having a lateral wall on a side away from the first housing,
- wherein each second housing is rotatable relative to the first housing between a first position in which the lateral wall of the second housing is engaged with a side edge of a corresponding handle controller, preventing the corresponding handle controller from moving away from the main body along the lateral direction; and a second position in which the lateral wall of the second housing is disengaged with the side edge of the corresponding handle controller, allowing the corresponding handle controller to be detached from the main body along the lateral direction.

The above-mentioned protective case for the game device ensures that the first housing and the main body of the game device are well engaged to have a stable relative position between them. Through rotational engagement between the second housings and the first housing, the second housings may rotate relative to the first housing between a first position and a second position. In case that the first housing is engaged with the main body and the main body is connected to the handle controllers, the lateral walls of the second housings in the first position may cover the side edges of the corresponding handle controllers. This enables the second housings to protect the handle controllers. The lateral walls of the second housings may prevent the handle controllers from moving laterally away from the main body, thereby preventing the handle controllers from detaching from the main body. In case that the second housings rotate to the second position relative to the first housing, the positions of the main body and the handle controllers remain unchanged relative to the first housing. Consequently, the sidewalls of the second housings disengage from the side edges of the corresponding handle controllers, allowing the handle controllers to be easily detached laterally from the main body. If the handle controllers need to be reattached to the main body, it suffices to keep the second housings in the second position. During the process of setting the connection between the handle controllers and the main body, it is only necessary to rotate the second housings to the second position relative to the first housing. This eliminates the need to repeatedly separate the main body from the first housing, thereby avoiding complicate steps in setting connection process caused by the use of the protective device for the game device.

DESCRIPTION OF THE EMBODIMENTS

Figure 1:
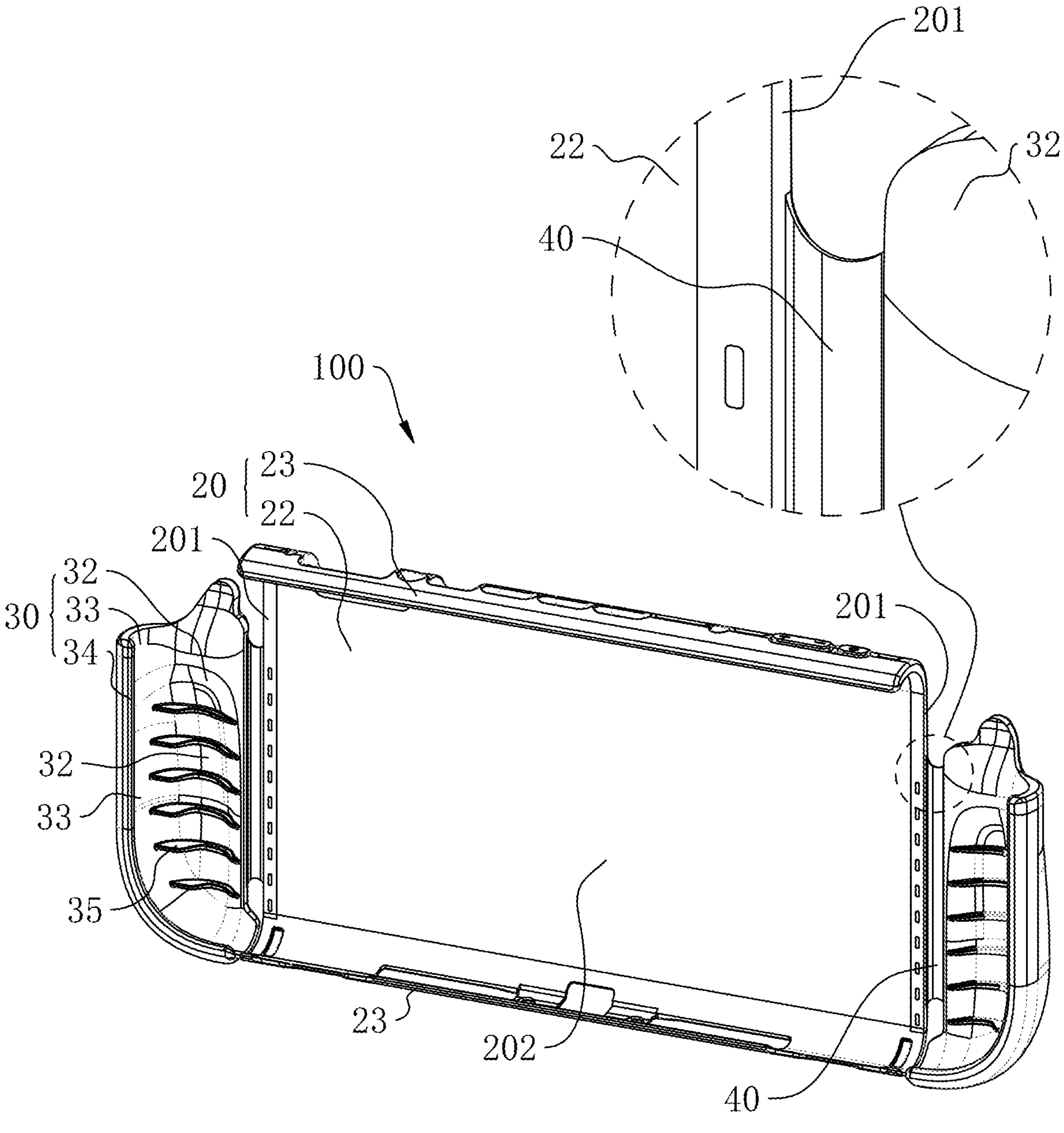
FIG. 1 is a schematic structural view of a protective case for a game device according to a first embodiment of the present disclosure, wherein second housings are in a first position.

The technical solution in the embodiments of the present disclosure will be clearly and completely described below with reference to accompanying drawings in the embodiments of the present disclosure. Obviously, the described embodiments are only a part of the embodiments of the present disclosure, but not all of the embodiments. Based on the embodiments of the present disclosure, all other embodiments obtained by those skilled in the art without any creative efforts fall within the protection scope of the present disclosure.

In the specification, it should be noted that the oriental or positional relationships indicated by the terms "longitudinal", "central", "up", "down", "left", "right", "vertical", "horizontal", "inner", "outer", and the like are only intended to facilitate the description of the present disclosure and simplify the description, not to indicate or imply that the apparatus or element referred must have a specific orientation, is constructed and operated in a specific orientation, and therefore cannot be understood as a limitation of the present disclosure. Furthermore, the terms "first", "second", and "third" are used for descriptive purposes only and should not be understood as indicating or implying relative importance.

In the description of the present disclosure, it should be noted that unless otherwise explicitly specified or limited, the terms "mount," "join," and "connect" should be interpreted broadly. For example, they may refer to fixed connections, detachable connections, integrated connections, mechanical connections, electrical connections, direct connections, or indirect connections via an intermediary medium. They may also refer to internal communication between two components. Those skilled in the art can understand the specific meanings of these terms in the present disclosure based on the particular context.

The following describes the technical solutions provided in the embodiments of the present disclosure with reference to the accompanying drawings.

FIG. 1 to FIG. 19*b* illustrate a protective case 100 for a game device according to at least one embodiment of the present disclosure. Specifically, referring to FIG. 2*b* and FIG. 3*b*, the protective case 100 is used to provide protection for the game device 800. In some embodiments, the game device 800 includes a main body 810 and two handle controllers 820 that are detachably connected to the two sides of the main body 810. The main body 810 and the handle controllers 820 have an engaged state or a detached state. Furthermore, a top side 811 and a bottom side 812 of the main body 810 are equipped with buttons or interfaces. The main body 810 has two opposite sides, with the direction extending along the two sides approximately perpendicular to the direction extending along the top side 811 and bottom side 812. In the engaged state, one side of the main body 810 is connected to a handle controller 820, alternatively, both sides of the main body 810 are respectively connected to handle controllers 820.

Figure 2A:
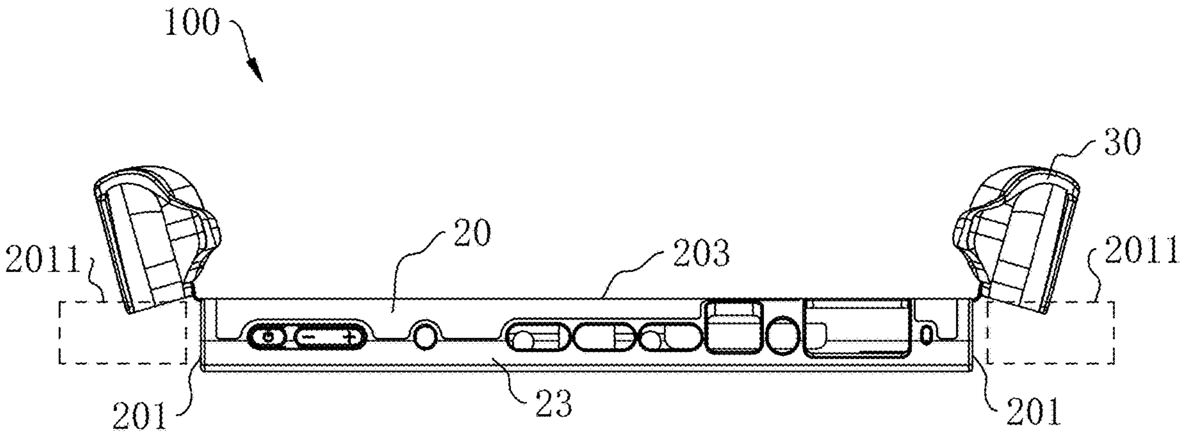
FIG. 2*a* is a top view of the protective case for the game device in FIG. 1, wherein the second housings are in a second position.
Figure 2B:
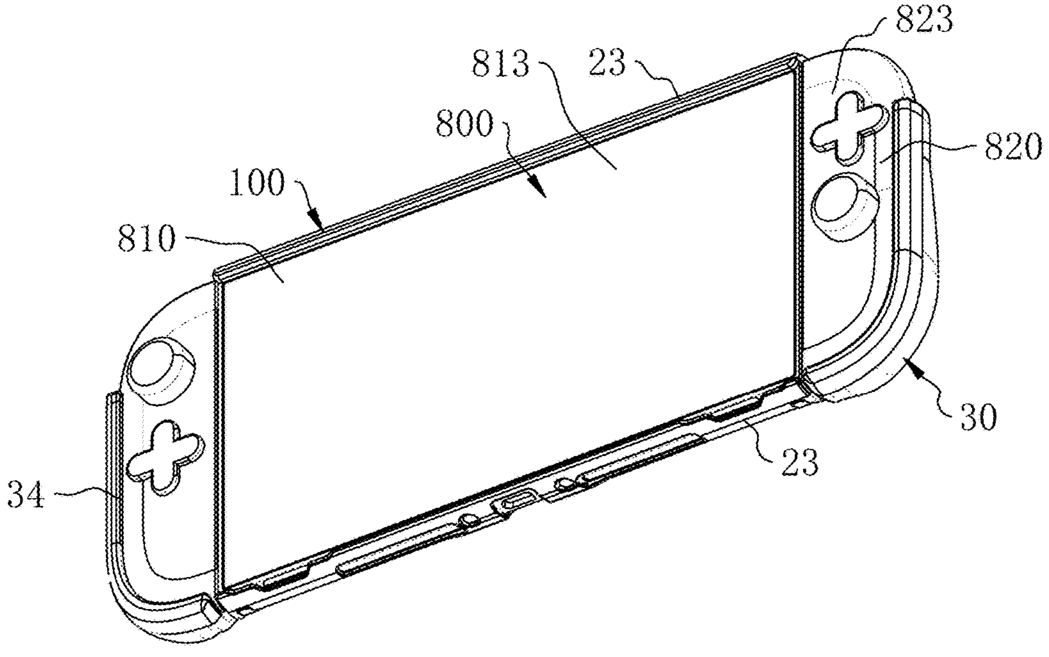
FIG. 2*b* is a schematic structural view of the protective case for the game device in FIG. 1, the protective case being sleeved over the game device.
Figure 3A:
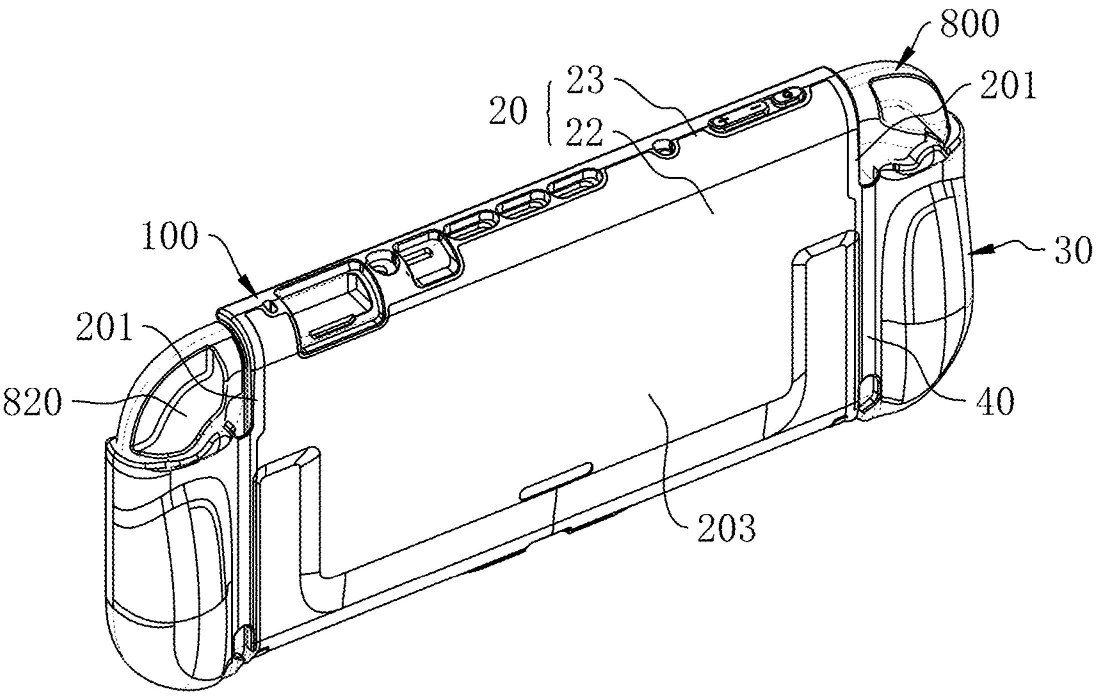
FIG. 3*a* is a schematic structural view of the protective case for the game device in FIG. 2*b* from another perspective.
Figure 3B:
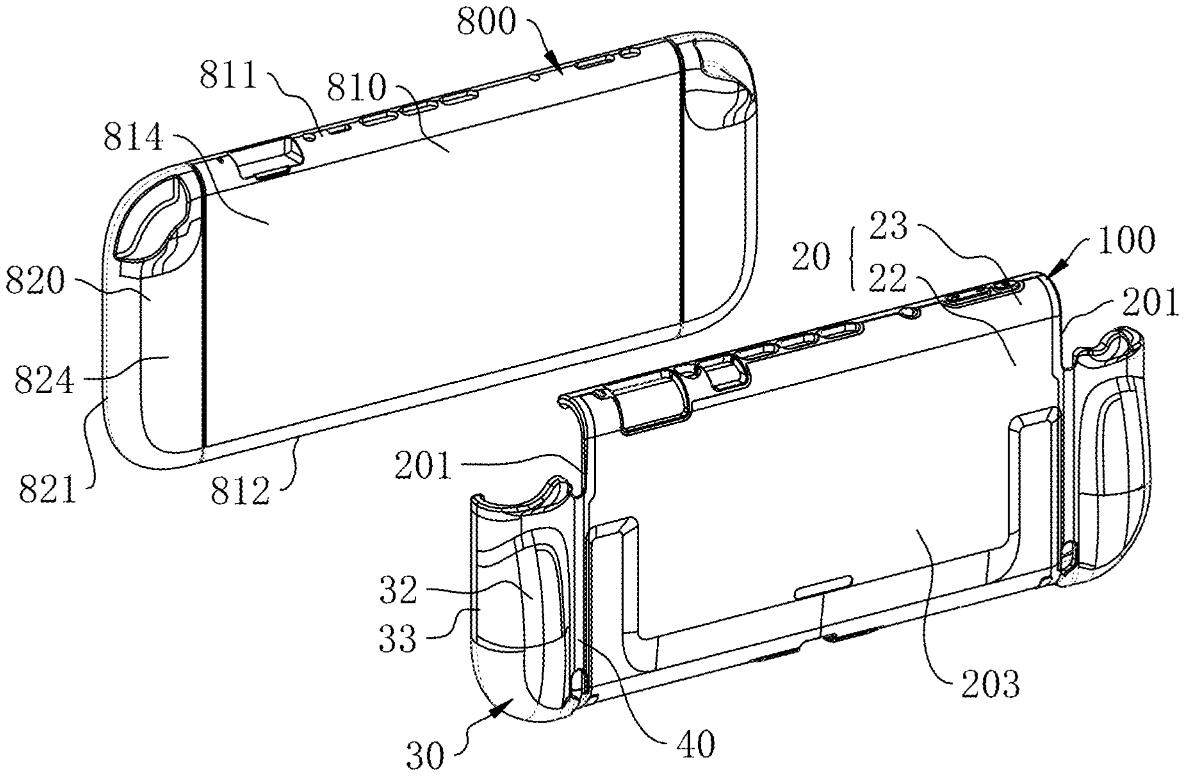
FIG. 3*b* is a schematic structural view of the protective case for the game device in FIG. 3*a*, the protective case being detached from the game device.

Further referring to FIG. 2*b* and FIG. 3*b*, the main body 810 has a front surface 813 and a back surface 814, which are opposite each other. The direction extending along the front surface 813 and the back surface 814 is approximately perpendicular to both the direction extending along the two sides and the direction extending along the top side 811 and bottom side 812. A display screen is provided on the front surface 813 of the main body 810.

Specifically, the game device 800 is also equipped with a base 900. Optionally, the base 900 provides support for the game device 800, allowing the game device to remain in an approximately vertical position. Alternatively, the base 900 is configured to supply charging power to the main body 810.

More specifically, the base 900 includes a bottom 901, a first limiting portion 902, and a second limiting portion 903. The bottom 901 is connected between the first limiting portion 902 and the second limiting portion 903. The first limiting portion 902 and the second limiting portion 903 are at least partially spaced apart, forming an inserting slot 904 between them. The distance between the first limiting portion 902 and the second limiting portion 903 is slightly greater than the thickness of the main body 810, allowing the main body 810 to be inserted into the inserting slot 904 even when covered by the protective case 100.

More specifically, the distance between two side edges of the first limiting portion 902 is less than or equal to the width of the main body 810. Understandably, the direction extending along the two sides of the first limiting portion 902 is perpendicular to the direction extending along the first limiting portion 902 and the second limiting portion 903, and parallel to the bottom surface of the base 900. Similarly, the distance between two side edges of the second limiting portion 903 is less than or equal to the width of the main body 810.

In some embodiments, the bottom side 812 of the main body 810 is equipped with a charging interface, and the base 900 has an output interface. When the game device 800 is placed on the base 900, the charging interface of the main body 810 and the output interface of the base 900 are electrically connected, allowing the base 900 to provide charging current to the main body 810.

Alternatively, the base 900 may also wirelessly transfer energy to the main body 810.

Figure 4:
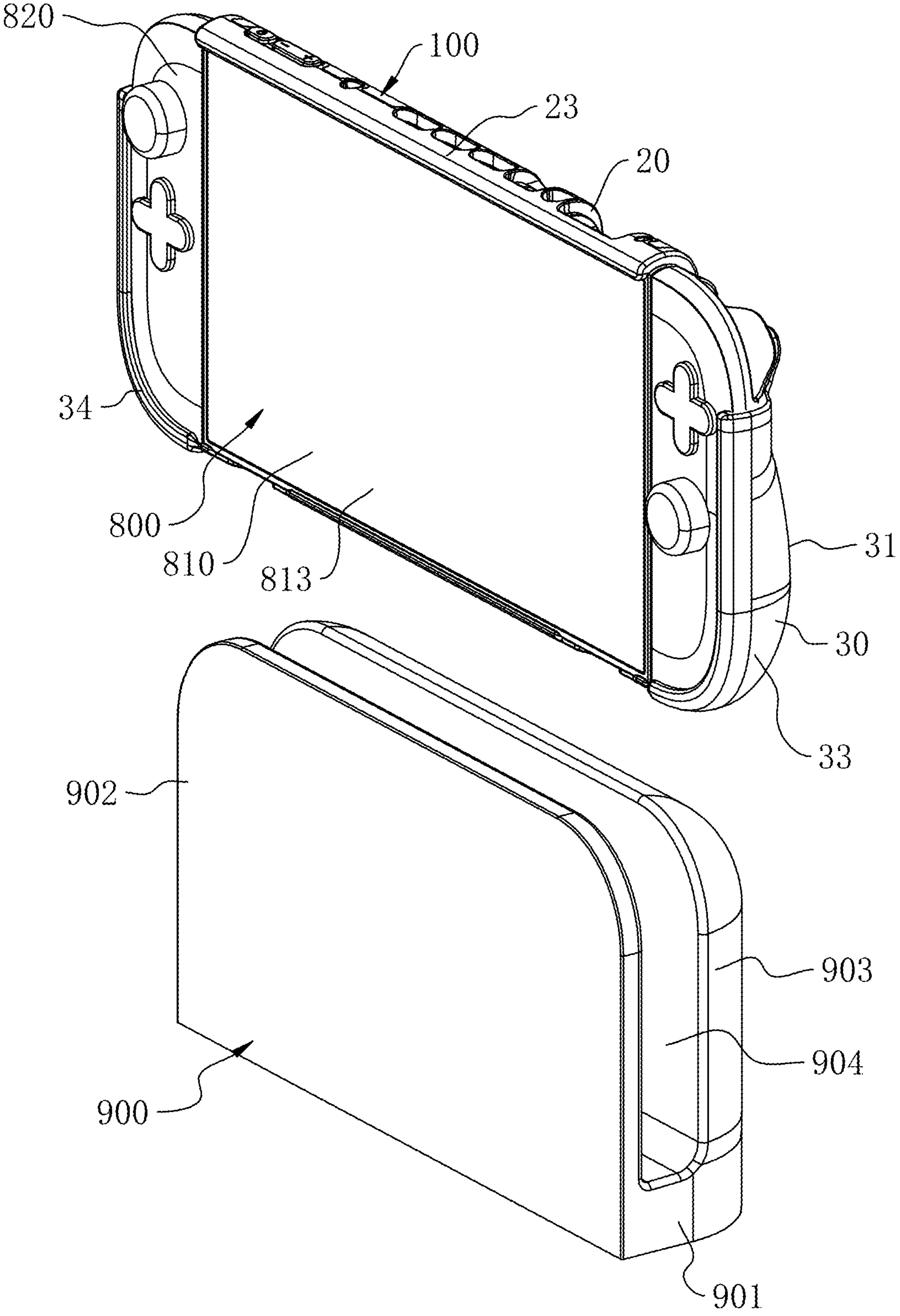
FIG. 4 is a schematic structural view of the game device and the protective case for the game device in FIG. 2*a*, the game device and the protective case being separated from a base.
Figure 5:
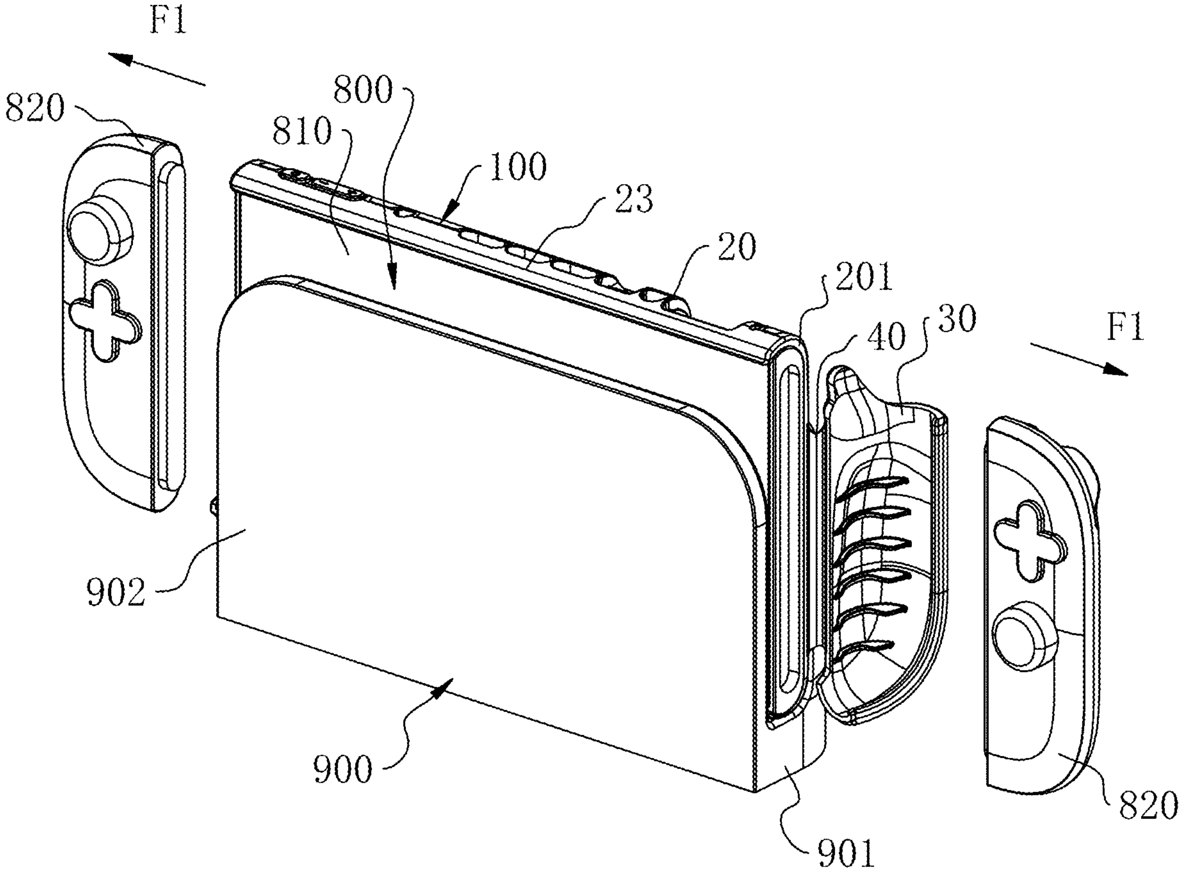
FIG. 5 is a schematic structural view of the game device and the protective case for the game device in FIG. 2*a*, the game device and the protective case being engaged with the base, wherein handle controllers are removed from a main body.

Additionally, the handle controllers 820 are equipped with joysticks and buttons. Optionally, in the engaged state, the handle controllers 820 and the main body 810 are electrically connected to transmit control signals or supply power. Specifically, as shown in FIG. 4 and FIG. 5, as for a single handle controller 820, the direction F1 in which the handle 820 separates from the main body 810 is from the side of the main body 810 closer to the handle 820 toward the side of the main body 810 farther from the handle 820. For example, two sides of the main body 810 may be referred to as the first coupling side and the second coupling side, respectively. For a handle controller 820, the first coupling side is closer to the handle 820 than the second coupling side, meaning the direction F1 of separation of the handle 820 from the main body 810 aligns with the direction from the second coupling side toward the first coupling side.

Figure 6:
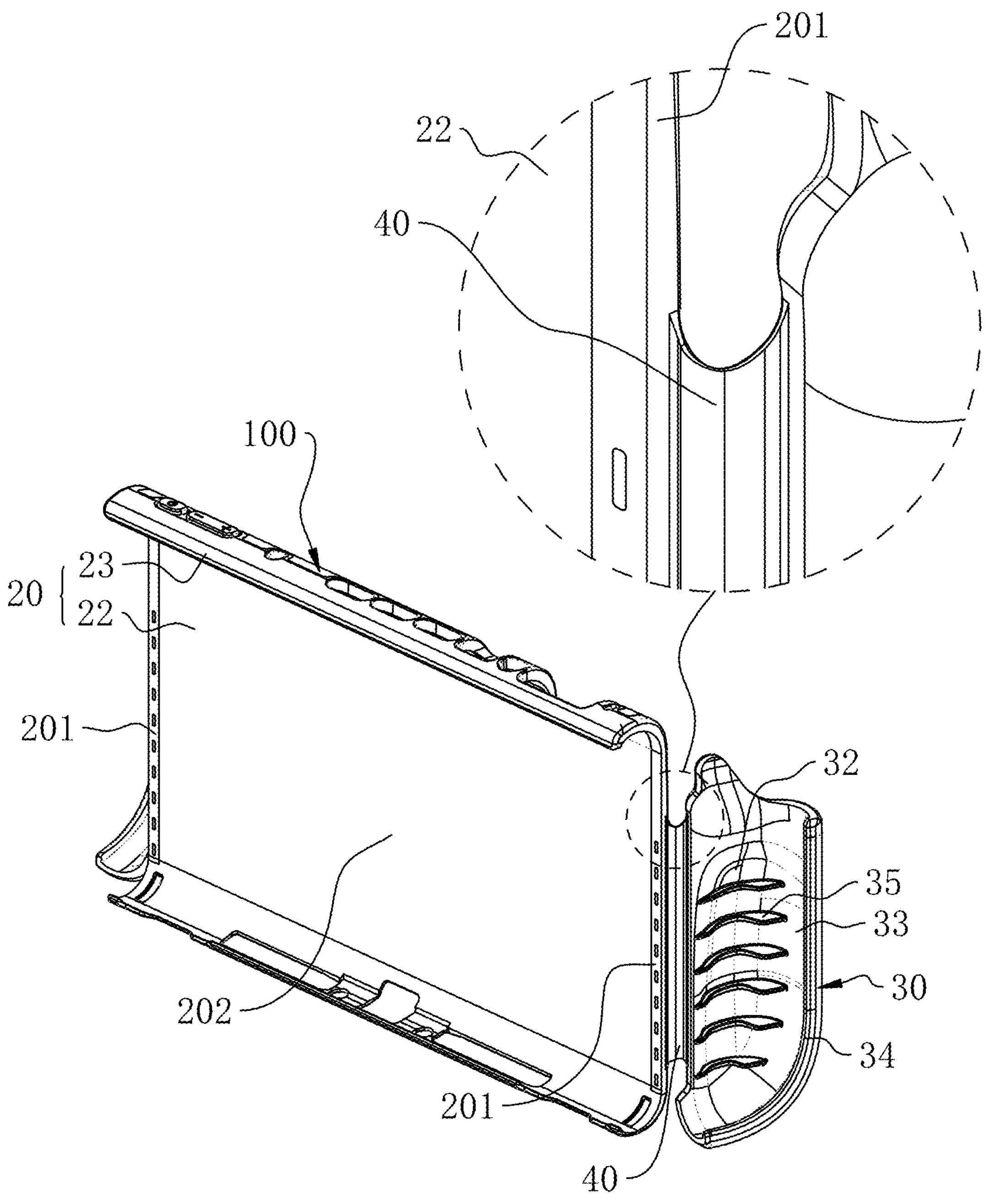
FIG. 6 is a schematic structural view of the protective case for the game device in FIG. 1, wherein the second housings are in the second position.
Figure 7A:
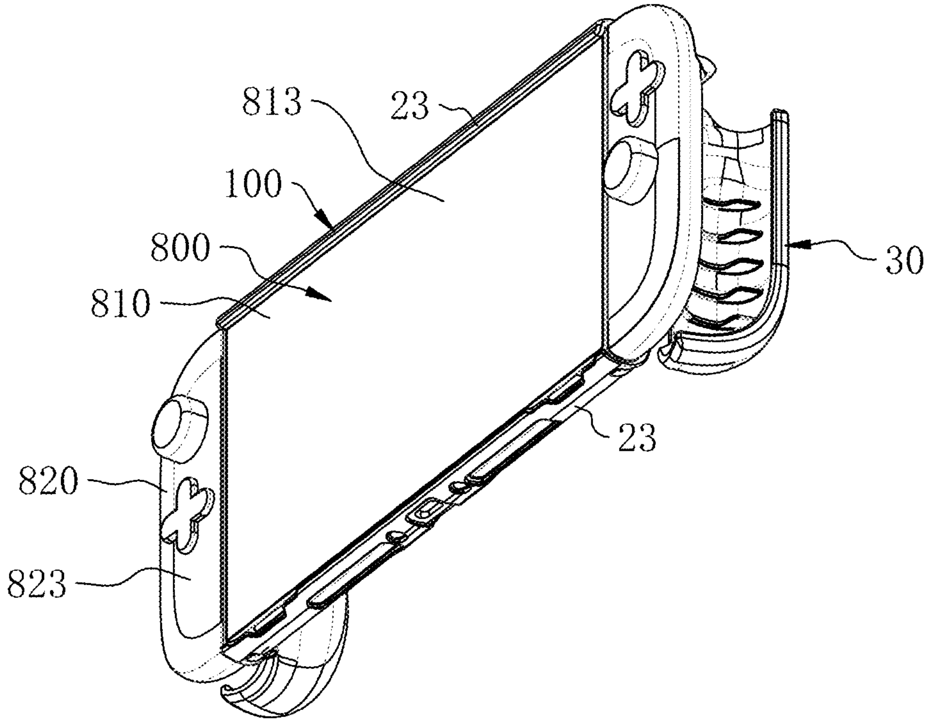
FIG. 7*a* is a schematic structural view of the protective case for the game device in FIG. 6, the protective case being sleeved over the game device.
Figure 7B:
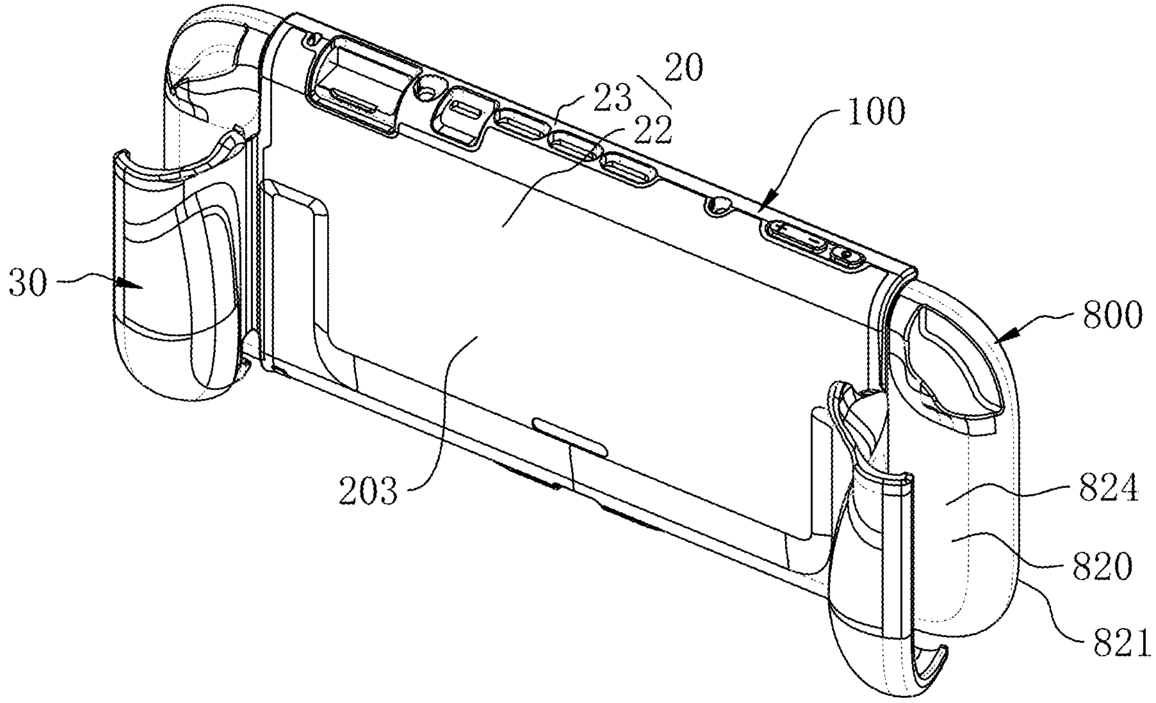
FIG. 7*b* is a schematic structural view of the protective case for the game device in FIG. 7*a* from another perspective.

In some embodiments, as shown in FIG. 1 and FIG. 6, the protective case 100 for the game device includes a first housing 20 and two second housings 30. The first housing 20 is configured to accommodate the main body 810 of the game device 800. The first housing 20 has two opposite sides along a lateral direction. The two second housings 30 are respectively and rotatably connected to the two side edges of the first housing 20, and are configured to accommodate the two handle controllers 820. Each second housing 30 has a lateral wall 33 on the side away from the first housing 20. Each second housing 30 has a first position and a second position relative to the first housing 20. In case that the second housing 30 is in the first position, the lateral wall 33 of the second housing 30 covers a side edge of a corresponding handle controller 820, preventing the handle controller 820 from moving laterally away from the main body 810. In case that the second housing 30 rotates to the second position, the lateral wall 33 of the second housing 30 detaches from the side of the corresponding handle controller 820, allowing the handle controller 820 to detach laterally from the main body 810.

The protective case for the game device ensures that the first housing 20 and the main body 810 of the game device 800 are well engaged to have a stable relative position between them. Through rotational engagement between the second housings 30 and the first housing 20, the second housings 30 may rotate relative to the first housing 20 between a first position and a second position. In case that the first housing 20 is engaged with the main body 810 and the main body 810 is connected to the handle controllers 820, the lateral walls 33 of the second housings 30 in the first position may engage with the side edges of the corresponding handle controllers 820. This enables the second housings 30 to protect the handle controllers 820 while preventing them from moving laterally away from the main body 810, thereby restricting the handle controllers 820 from detaching from the main body 810. In case that the second housings 30 rotate to the second position relative to the first housing 20, the positions of the main body 810 and the handle controllers 820 remain unchanged relative to the first housing 20. Consequently, the lateral walls 33 of the second housings 30 disengage from the side edges of the corresponding handle controllers 820, allowing the handle controllers 820 to be easily detached laterally from the main body 810. If the handle controllers 820 need to be reattached to the main body 810, it suffices to keep the second housings 30 in the second position. During the process of adjusting the connecting between the handle controllers 820 and the main body 810, it is only necessary to rotate the second housings 30 relative to the first housing 20 to the second position. This eliminates the need to repeatedly separate the main body 810 from the first housing 20, thereby avoiding complicate process for connecting and adjusting the handle controllers 820 and the main body 810 caused by the use of the protective case 100 for the game device.

Specifically, the first housing 20 further includes a front side 202 and a back side 203. When the first housing 20 is engaged with the main body 810, the front side 202 of the first housing 20 faces the back surface 814 of the main body 810, and the first housing 20 is capable of covering all or part of the back surface 814 of the main body 810, thereby providing protection for the back surface 814 of the main body 810. In case that the second housing 30 is in the first position, the second housing 30 and the first housing 20 defines a receiving space 2011 therebetween. The handle controller 820 is housed within the receiving space 2011, and the lateral wall 33 of the second housing 30 defines the boundary of the receiving space 2011 away from the first housing 20. Exemplarily, the lateral direction may be understood to align with the direction F1.

Specifically, as shown in FIG. 5, in case that the main body 810 is covered with the protective case 100 for the game device and inserted into the inserting slot 904 of the base 900, the second housing 30 is able to flip toward the back side 203 of the first housing 20 and reach the second position since the distance between the two sides of the first limiting portion 902 or the second limiting portion 903 is less than or equal to the width of the main body 810. To detach the handle controller 820 from the main body 810, it is only necessary to rotate the second housing 30 relative to the first housing 20 to the second position. In this way, the handle controller 820 may be detached from the main body 810 along direction F1. There is no need to remove the main body 810 from the base 900 or separate it from the first housing 20, thereby simplifying the operation for detaching the handle controller 820.

Specifically, the connecting adjustment process between the handle controller 820 and the main body 810 may be understood as the engaging process and the disengaging process between the handle controller 820 and the main body 810.

Exemplarily, for simplicity and ease of understanding, the two lateral sides 201 of the first housing 20 are briefly described as the first side and the second side. For the receiving space 2011 corresponding to the first side, it is located on the side of the first side and away from the second side. For the receiving space 2011 corresponding to the second side, it is located on the side of the second side and away from the first side. As shown in FIG. 2*a*, the receiving space 2011 may be understood as the space extending from the end of one of the two lateral sides 201 of the first housing 20 in a direction away from the other of the two lateral sides 201. The direction extending along the two lateral sides 201 of the first housing 20 are roughly parallel to the direction extending along the two sides of the main body 810 in case that the main body 810 and the first housing 20 are in an engaging state. In this way, the receiving space 2011 on one lateral side 201 serves as the passage for the handle controller 820 when detaching from the main body 810 along direction F1. It is understood that the spatial range of the receiving space 2011 is at least greater than the volume of a single handle controller 820.

In some embodiments, as shown in FIG. 1 and FIG. 6, the two lateral sides 201 of the first housing 20 are each connected to a second housing 30. Specifically, in case that handle controllers 820 are connected to both sides of the main body 810, the second housings 30 corresponding to the two lateral sides 201 of the first housing 20 cover the external surfaces of different handle controllers 820, ensuring that both handle controllers 820 are protected.

In other embodiments, in case that only one side of the main body 810 is connected to a handle controller 820, one lateral side 201 of the first housing 20 may be connected to a second housing 30, while the other lateral side 201 forms a protective wall structure to provide coverage and protection for the other side of the main body 810.

In some embodiments, as shown in FIG. 1 and FIG. 6, the protective case 100 for the game device includes flexible strips, and the first housing 20 and each second housing 30 are provided with a flexible strip 40 therebetween. The flexible strip 40 is connected and extends along a gap between the first housing 20 and the corresponding second housing 30. Specifically, through the folding and deformation of the flexible strip 40, the position of the second housing 30 relative to the first housing 20 may be adjusted between the first and second positions. The direction of the creases on the flexible strip 40 is roughly parallel to the extension direction of the gap between the first housing 20 and the second housing 30. Specifically, the flexible strip 40 is made of a flexible material.

Specifically, the flexible strip 40 is made of a flexible or deformable material. Optionally, the flexible strip 40 is made of thermoplastic polyurethane elastomer. Alternatively, the flexible strip 40 may also be made of other flexible or deformable materials. In a free state, the flexible strip 40 is in a straight strip shape, with its width direction roughly parallel to the direction extending along the first housing 20 and the second housing 30.

In some embodiments, as shown in FIG. 7*a* to FIG. 9, the protective case 100 for the game device further includes positioning pivots 50. The first housing 20 and each second housing 30 are provided with a positioning pivot 50 therebetween. The positioning pivot 50 enables a rotational fit between the first housing 20 and the second housing 30.

Optionally, the positioning pivot 50 is inserted into the first housing 20 and the second housing 30. Furthermore, at least one of the first housing 20 and the second housing 30 may rotate relative to the positioning pivot 50. Specifically, the second housing 30 rotates around the central axis of the positioning pivot 50 relative to the first housing 20. Additionally, one lateral side 201 of the first housing 20 is provided with a plurality of first protrusions 21 spaced arranged along a line. The side of the second housing 30 facing the first housing 20 is provided with a plurality of second protrusions 31 spaced arranged along a line similarly. The positioning pivot 50 is inserted through the first protrusions 21 and the second protrusions 31, and at least one of the first protrusions 21 and one of the second protrusions 31 may rotate relative to the positioning pivot 50.

Optionally, one of the first housing 20 or the second housing 30 is connected to the positioning pivot 50, and the other of the first housing 20 or the second housing 30 is rotatably fitted onto the outer circumference of the positioning pivot 50. Alternatively, one of the first housing 20 or the second housing 30 may be integrally connected to the positioning pivot 50, while the other of the first housing 20 or the second housing 30 is sleeved around the outer periphery of the positioning pivot 50.

Optionally, the positioning pivot 50 may be rod-shaped, tubular, or post-like. More specifically, each lateral side 201 of the first housing 20 is provided with first protrusions 21, each of the first protrusions 21 is provided with two grooves or recessed holes on opposite sides. The second housing 30 is equipped with two positioning pivots 50 arranged opposite each other in a post-like shape. These pivots 50 are rotatably inserted into the grooves or recessed holes.

In some embodiments, as shown in FIG. 1 and FIG. 6, the first housing 20 includes a back plate 22 and at least two main side walls 23 connected to the back plate 22. The at least two main side walls 23 are bent towards a front direction relative to the back plate 22 and are spaced apart from each other. Specifically, since the back plate 22 is connected between the two main side walls 23, the first housing 20 is U-shaped when viewed from the perspective of one lateral side 201. In case that the first housing 20 and the main body 810 are engaged, the main body 810 is housed between the two opposite main side walls 23, one of the two main side walls 23 covers the top side 811 of the main body 810 and the other of the two main side walls 23 covers the bottom side 812, thereby protecting both the top side and the bottom side of the main body. The back plate 22 covers the back surface 814 of the main body 810.

It is understood that the front direction refers to the direction from the front side 202 away from the back side 203. The direction extending along the main side wall 23 corresponding to the top side 811 and the main side wall 23 corresponding to the bottom side 812 is roughly perpendicular to the direction extending along the two lateral sides 201. The extension direction of the main side walls 23 is generally parallel to the direction along the two lateral sides 201. In the first position, the second housing 30 cooperates with the main side walls 23 to jointly sleeve around the outer periphery of the game device 800.

Further, as shown in FIG. 1, the main side walls 23 are connected to the edges of the back plate 22. The transition between the back plate 22 and the main side walls 23 may be an angled or arcuate structure.

In other embodiments, the first housing 20 and the main body 810 may be engaged through snap-fit, magnetic attraction, adhesive bonding, or other methods, ensuring that the first housing 20 and the main body 810 are not easily separated.

In some embodiments, as shown in FIG. 1, the flexible strip 40 is integrally connected to the first housing 20, enhancing the stability of the connection between the flexible strip 40 and the first housing 20. Specifically, one part of the first housing 20 is made of a rigid material, while other part is made of a flexible material. For example, the portion near the lateral side 201 of the first housing 20 is made of a flexible material and integrally connected to the flexible strip 40. Optionally, the back plate 22 is made of a rigid material, one part of the main side wall 23 is made of a rigid material and other part is made of a flexible material.

In other embodiments, the flexible strip 40 may be partially adhered to the first housing 20 and partially adhered to the second housing 30.

Specifically, the flexible material has flexibility or elasticity, and the rigid material and the flexible material are integrated through injection molding. Optionally, the rigid material is polycarbonate or other materials that are not easily deformed.

In some embodiments, as shown in FIG. 1, each second housing 30 further includes a back wall 32 rotatably connected to the first housing 20, the lateral wall 33 is connected to the back wall 32, and the lateral wall 33 is bent relative to the back wall 32. In case of being in the first position, the lateral wall 33 is at least partially positioned opposite to one side of the two lateral sides 201 of the first housing 20. Specifically, as shown in FIG. 2*b* and FIG. 3*b*, the handle controller 820 has a front surface 823 and back surface 824. The front surface 823 of the handle controller 820 is equipped with joysticks and buttons. The handle controller 820 includes an engaging surface and a peripheral side surface 821, which collectively enclose the outer periphery of the handle controller 820. In case that the main body 810 and the handle controller 820 are in an engaging state, the engaging surface is positioned opposite to the main body 810, and the peripheral side surface 821 is adjacent to the engaging surface. In case that the second housing 30 is in the first position relative to the first housing 20, the back wall 32 of the second housing 30 covers all or a part of the back surface 824 of the handle controller 820, and the lateral walls 33 cover a part of the peripheral side surface 821, thus providing partial surface protection for the handle controller 820.

Specifically, in case that the second housing 30 is in the second position relative to the first housing 20, the majority of the lateral walls 33 exit the receiving space 2011 on one lateral side 201 of the first housing 20, allowing the handle controller 820 to be separated from the main body 810 in a direction away from the main body 810.

In some embodiments, as shown in FIG. 1 and FIG. 2*b*, each second housing 30 comprises a flange 34, the flange 34 is connected to a side of the lateral wall 33 away from the back wall 32, and the flange 34 is bent relative to the lateral wall 33. Specifically, the flange 34 is elastic. In case that the second housing 30 rotates from the first position to the second position, the flange 34 may abut against the surface of the handle controller 820, preventing the second housing 30 from detaching from the handle controller 820 and enhancing the positional stability between the second housing 30 and the handle controller 820. Optionally, the flange 34 is integrally connected to the edge of the lateral walls 33 away from the back wall 32.

Figure 8A:
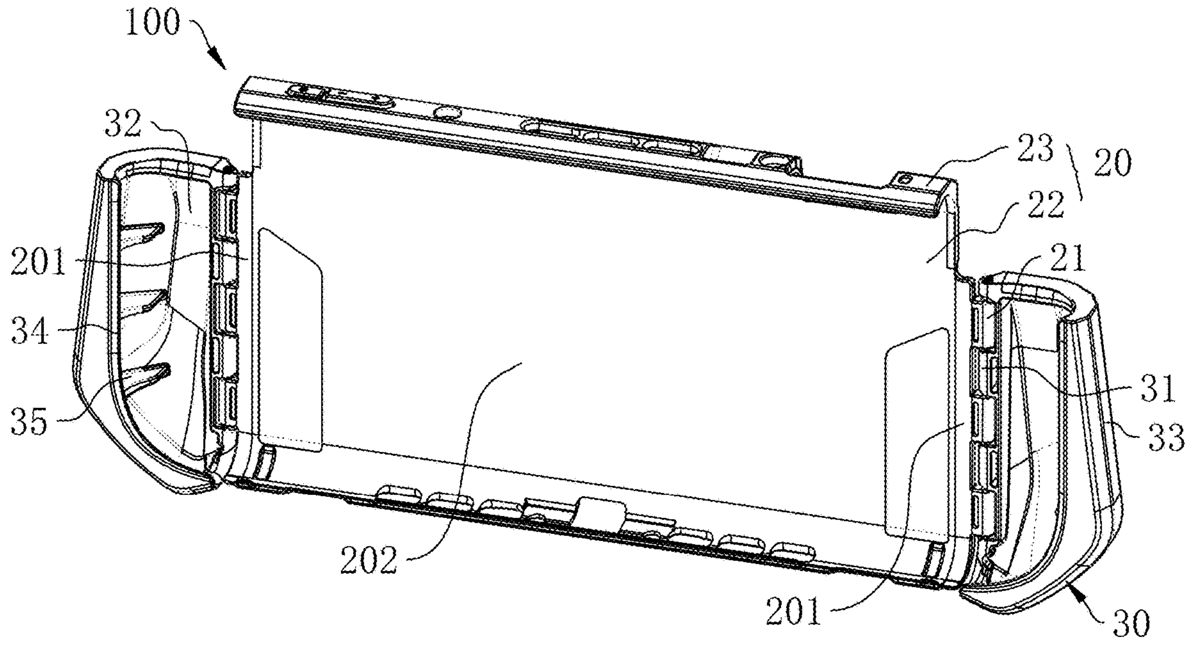
FIG. 8*a* is a schematic structural view of a protective case for a game device according to a second embodiment of the present disclosure, wherein second housings are in a first position.
Figure 8B:
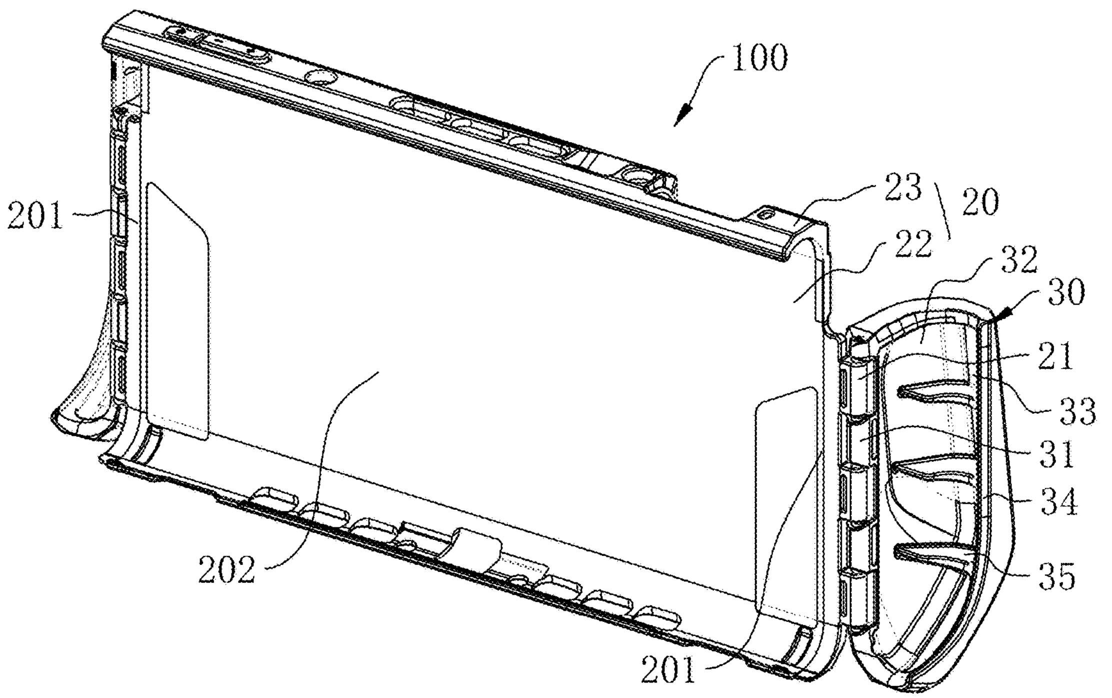
FIG. 8*b* is a schematic structural view of the protective case for the game device in FIG. 8*a*, wherein the second housings are in a second position.
Figure 9:
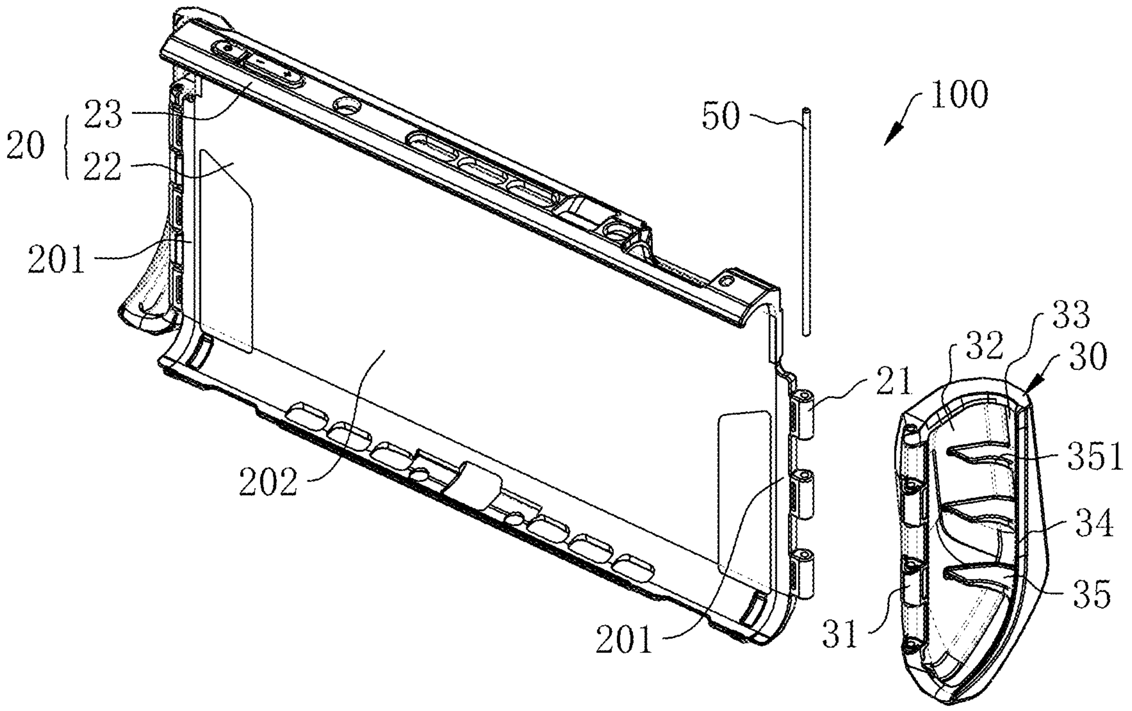
FIG. 9 is an exploded view of the protective case for the game device in FIG. 8*b;*

In some embodiments, as shown in Figures FIG. 1 and FIG. 8*b*, each second housing 30 comprises a plurality of reinforcing ribs 35, the plurality of reinforcing ribs 35 are connected between the back wall 32 and the lateral wall 33, and two adjacent reinforcing ribs 35 are spaced apart, thereby maintaining a relatively stable structural form between the back wall 32 and the lateral walls 33 and preventing deformation of the lateral walls 33. Furthermore, the lateral walls 33 and the reinforcing ribs 35 are elastic, and with the support of the reinforcing ribs 35, a gap is formed between the handle controller 820 and the lateral wall 33, providing cushioning and protection for the handle controller 820 when the second housing 30 suffers an impact.

In some embodiments, the reinforcing ribs 35 are connected to the back wall 32, the lateral walls 33, and the flange 34 respectively, thereby improving the structural stability between the flange 34 and the lateral walls 33.

In some embodiments, as shown in FIG. 8*b*, each reinforcing rib 35 is formed with an arcuate edge 351 on a side of each reinforcing rib 35 away from the back wall 32 and the lateral wall 33, allowing the reinforcing ribs 35 to fit tightly against the peripheral side surface 821 of the handle controller 820. The reinforcing ribs 35 provide better support between the handle controller 820 and the lateral wall 33.

In some embodiments, as shown in FIG. 6, the flexible strip 40 is integrally connected to the second housing 30, improving the connection stability between the flexible strip 40 and the second housing 30. Optionally, the second housing 30 is entirely made of flexible material.

Optionally, the back wall 32 is connected to the second protrusion 31. The back wall 32 and the second protrusion 31 are made of rigid materials, and the lateral walls 33, reinforcing ribs 35, and flanges 34 are made of flexible materials. Furthermore, the back wall 32, lateral walls 33, reinforcing ribs 35, and flanges 34 are integrally formed by injection molding.

Figure 13:
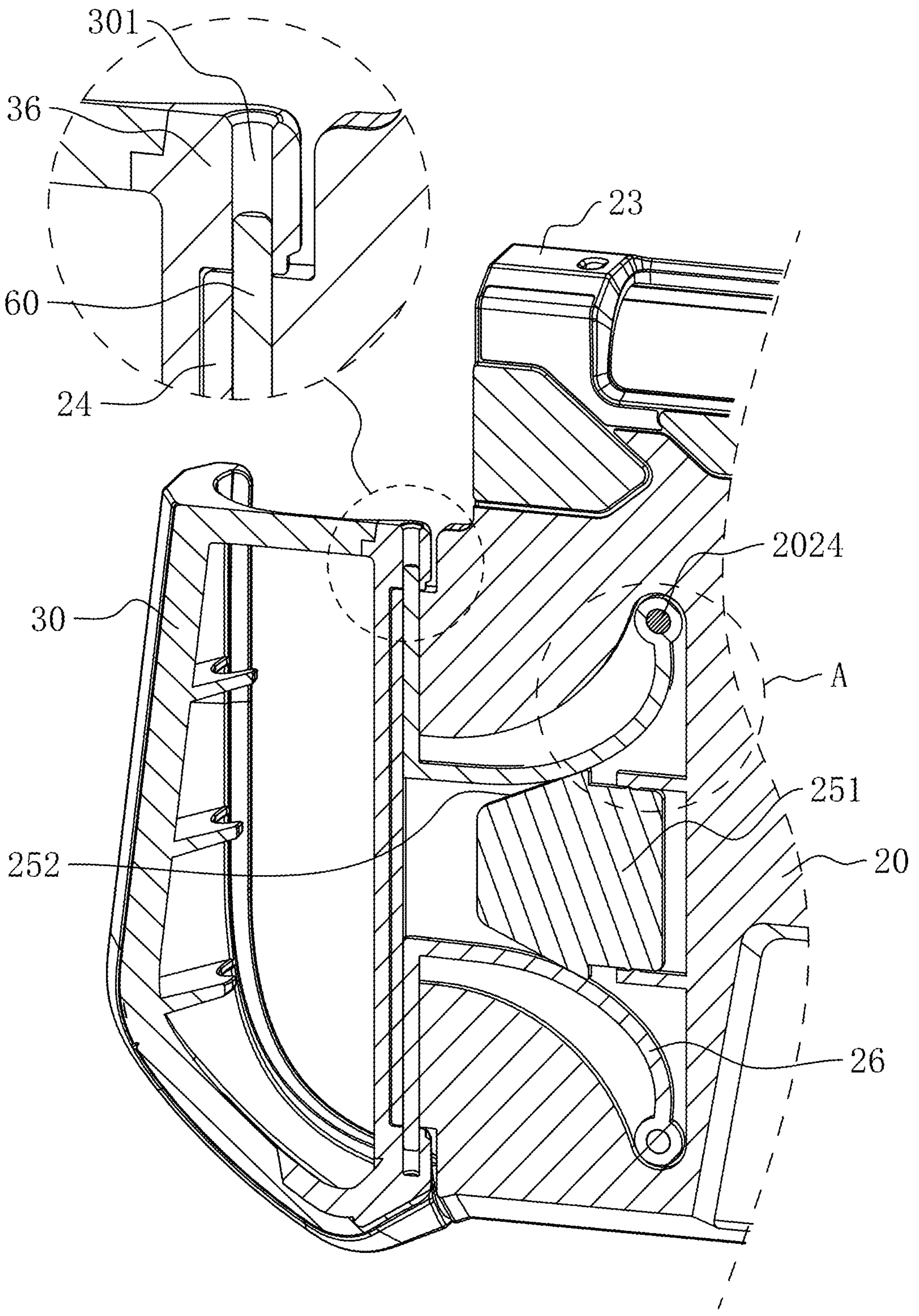
FIG. 13 is a cross-sectional view of the protective case for the game device in FIG. 12, wherein a movable pivot is in a first state and an operation component is in a third position.
Figure 15:
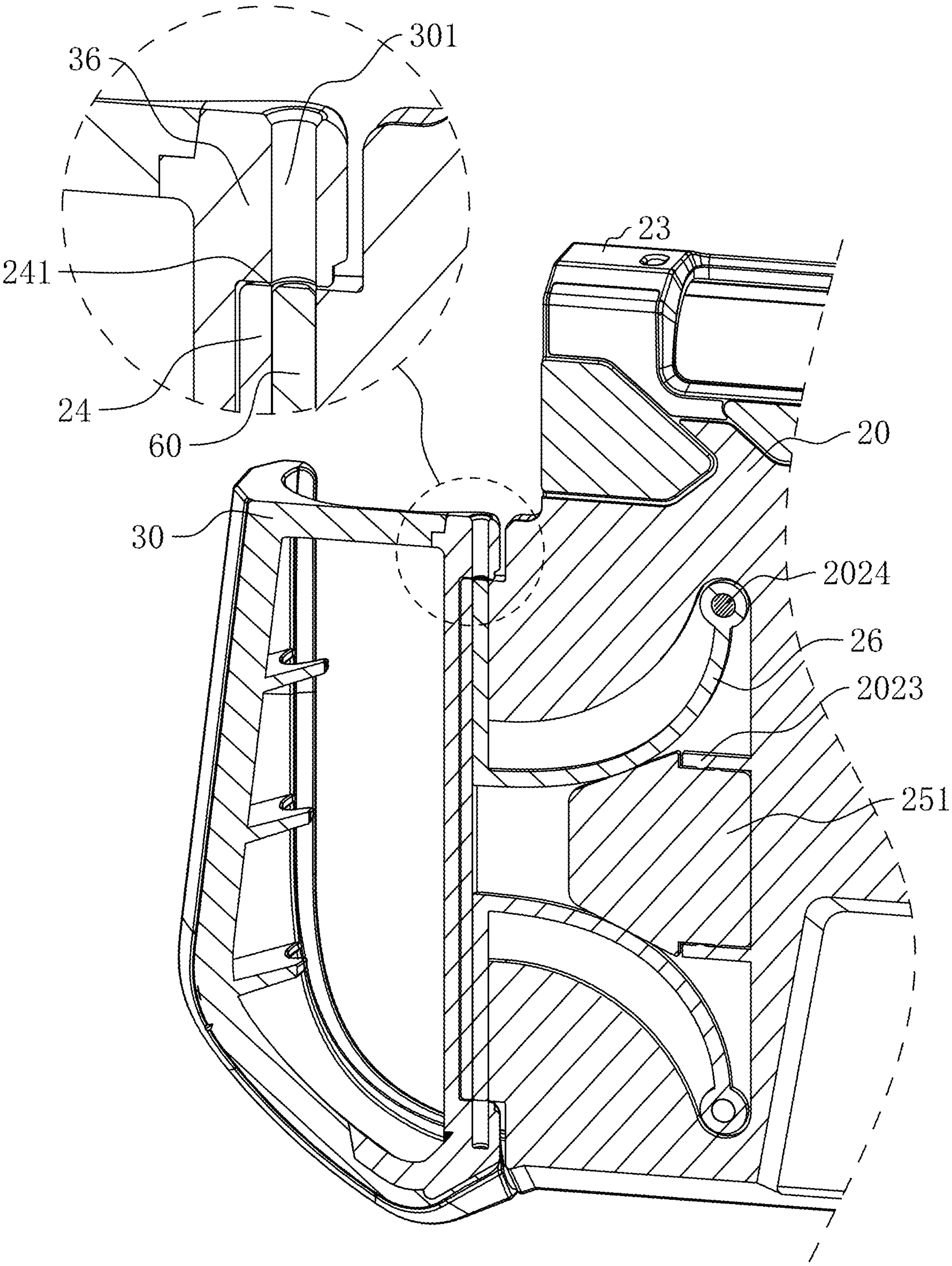
FIG. 15 is a cross-sectional view of the protective case for the game device in FIG. 12, wherein the movable pivot is in a second state and the operation component is in a fourth position.
Figure 16:
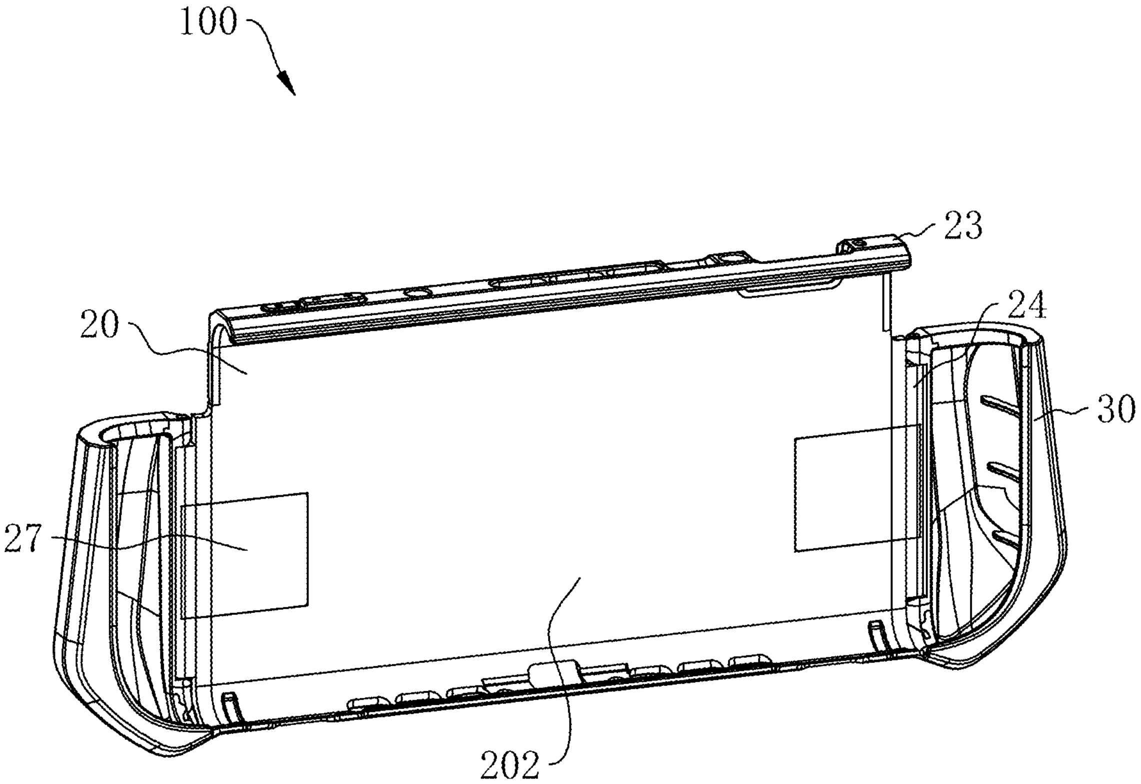
FIG. 16 is a schematic structural view of a protective case for a game device according to a fourth embodiment of the present disclosure, wherein second housings are in a first position.

In some embodiments, as shown in FIG. 13 and FIG. 15, the protective case 100 for the game device further includes movable pivots 60. The first housing 20 and each second housing 30 are provided with a movable pivot 60 therebetween, one of the first housing 20 and a corresponding second housing 30 is slidably installed with the movable pivot 60, and the other of the first housing 20 and the corresponding second housing 30 is provided with a limiting hole 301 configured for accommodating the movable pivot 60. The movable pivot 60 has a first state where at least a portion of the movable pivot 60 passes through the limiting hole 301 and a second state where the movable pivot 60 is outside the limiting hole 301. Specifically, in the first state, since the movable pivot 60 is inserted into the limiting hole 301, the inner wall surface of the limiting hole 301 circumferentially restricts the movable pivot 60, thereby preventing the separation of the first housing 20 and the second housing 30. The first housing 20 and the second housing 30 may rotate relative to each other around the central axis of the movable pivot 60, allowing the second housing 30 to switch between the first position and the second position through rotation. In the second state, since the movable pivot 60 is located outside the limiting hole 301, it is no longer restricted by the limiting hole 301, allowing the second housing 30 to separate from the first housing 20. As the second housing 30 is used to cover the handle controller 820, it frequently comes into contact with sweat or dirt from hands of the user and is subject to more frequent friction with the hands, leading to faster aging or soiling of the second housing 30. In case that the movable pivot 60 switches to the second state, the second housing 30 may be separated from the first housing 20, allowing the aged or soiled second housing 30 to be individually replaced without requiring the entire protective case 100 to be replaced. This reduces the replacement cost of the protective case 100 for the game device.

Figure 12:
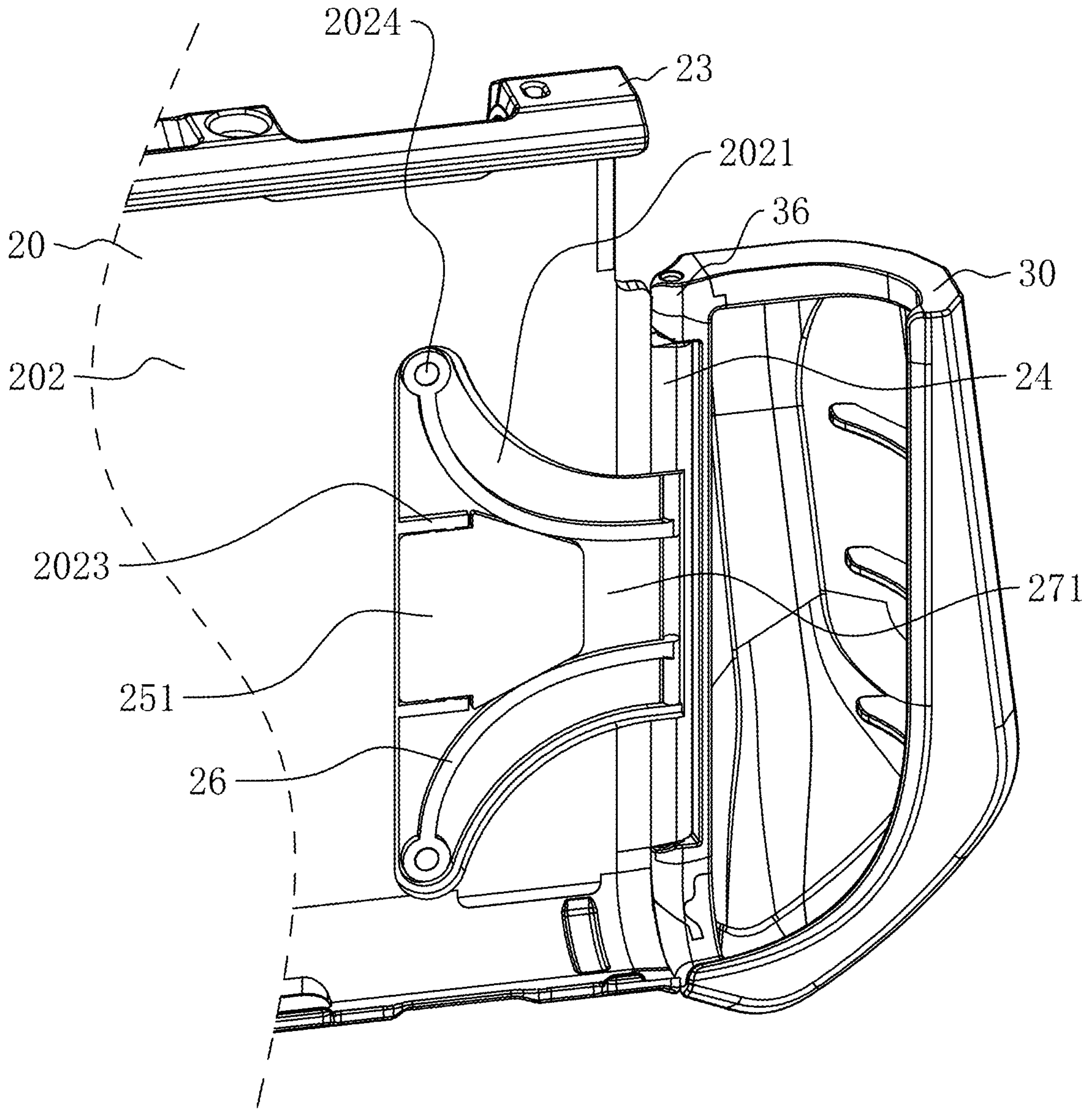
FIG. 12 is a schematic structural view of a part of the protective case for the game device in FIG. 10*a*, wherein a cover plate is removed.

Exemplarily, as shown in FIG. 12 and FIG. 13, the movable pivot 60 is slidably installed to the first housing 20, and the second housing 30 is provided with a limiting hole 301. Alternatively, the movable pivot 60 is slidably installed to the second housing 30, and the first housing 20 is provided with the limiting hole 301. Furthermore, the outer diameter of the movable pivot 60 is not less than the inner diameter of the limiting hole 301, allowing the movable pivot 60 to be smoothly inserted into the limiting hole 301.

Figure 10A:
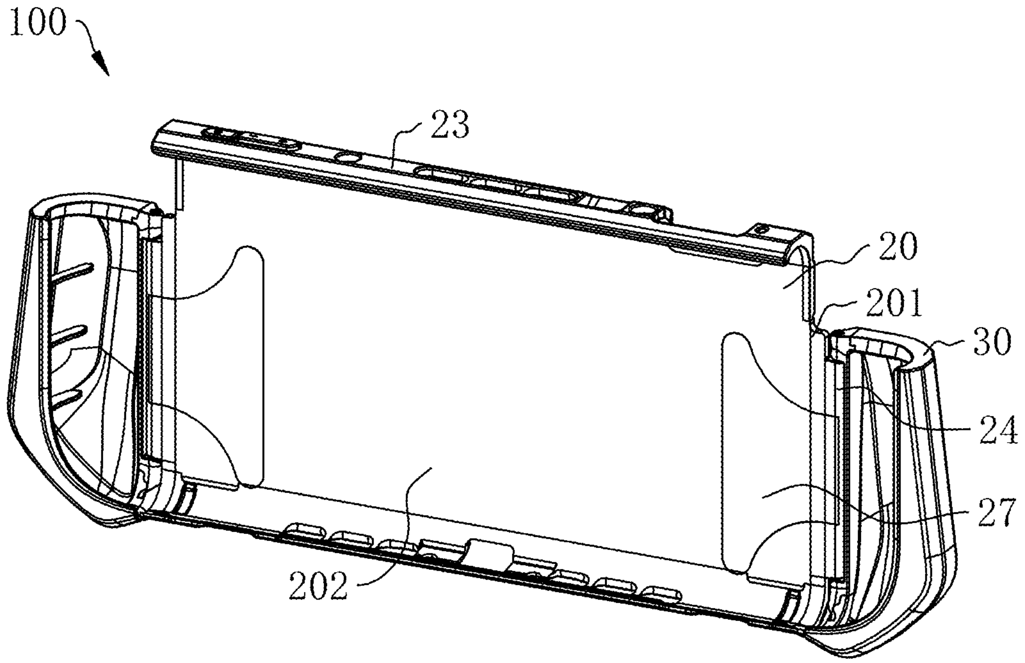
FIG. 10*a* is a schematic structural view of a protective case for a game device according to a third embodiment of the present disclosure, wherein second housings are in a first position.
Figure 10B:
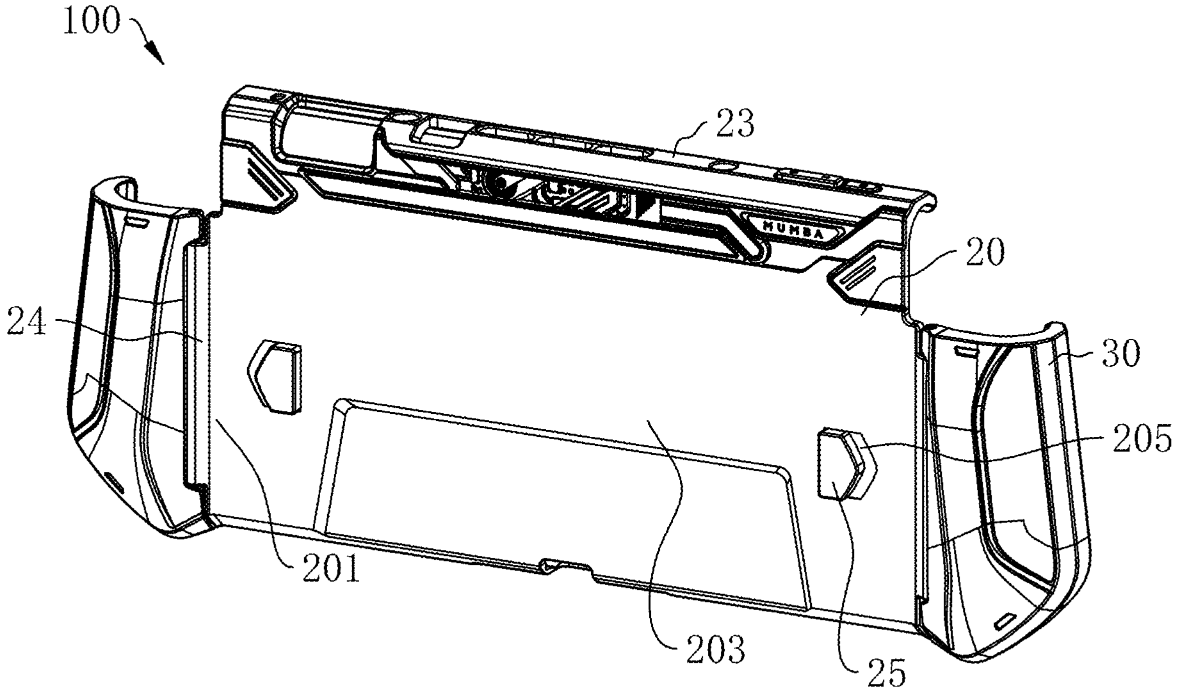
FIG. 10*b* is a schematic structural view of the protective case for the game device in FIG. 10*a* from another perspective.

In some embodiments, as shown in FIG. 10*b*, FIG. 12, and FIG. 13, the protective case 100 for the game device further operation components 25 and transmission components 26. The first housing 20 and each second housing 30 are provided with an operation component 25 and a transmission component 26 therebetween, one of the first housing 20 and the corresponding second housing 30 is movably installed with the operation component 25 and the transmission component 26, and the transmission component 26 is mechanically coupled between the operation component 25 and the movable pivot 60. Specifically, since the transmission component 26 is mechanically coupled between the operation component 25 and the movable pivot 60, in case that the user controls the operation component 25, the movable pivot 60 may move accordingly, switching between the first state and the second state. Thus, the user does not need to operate the movable pivot 60 directly. The operation component 25 may be shaped or positioned for easier operation.

Optionally, the operation component 25 may be slidably installed to the first housing 20 or rotatably installed to the first housing 20. Alternatively, the operation component 25 may be slidably or rotatably installed to the second housing 30.

In some embodiments, the transmission component 26 is elastic. As shown in FIG. 12 and FIG. 13, one end of the transmission component 26 is connected to the movable pivot 60, the other end of the transmission component 26 is positioned and connected to one of the first housing 20 and the corresponding second housing 30, and the operation component 25 is capable of sliding relative to and abutting against the transmission component 26. Specifically, under the abutting of the operation component 25, the transmission component 26 undergoes a certain degree of deformation. As the deformation amplitude of the transmission component 26 changes, the relative distance between its two ends changes. Since one end of the transmission component 26 is connected to the movable pivot 60 and the other end is fixedly connected to one of the first housing 20 and the second housing 30, when the deformation amplitude of the transmission component 26 changes, the position of the movable pivot 60 relative to the limiting hole 301 is adjusted, enabling the movable pivot 60 to switch between the first state and the second state.

Optionally, the operation component 25 has a third position and a fourth position relative to the first housing 20, and the other end of the transmission component 26 fixedly connected to the first housing 20. As shown in FIG. 15, in case that the operation component 25 is in the fourth position, the operation component 25 abuts against the transmission component 26, causing the transmission component 26 to undergo relatively low deformation. Under the limitation of the transmission component 26, the movable pivot 60 is in the second state being outside the limiting hole. As shown in FIG. 13, in case that the operation component 25 moves from the fourth position to the third position, the operation component 25 pushes the transmission component 26, increasing the deformation of the transmission component 26. Driven by the transmission component 26, the movable pivot 60 is switched to the first state, being inserted into the limiting hole 301.

Optionally, the elastic transmission component 26 is in a straight, zigzag, or curved shape in its natural state. As the deformation of the transmission component 26 increases, the bending degree also increases. Alternatively, in case that the transmission component 26 has a bending deformation, the operation component 25 abuts against an edge of the transmission component 26.

Exemplarily, the transmission component 26 is elastic, and the transmission component 26 may be made of plastic or memory metal materials.

In some embodiments, as shown in FIG. 17 to FIG. 19*a*, one of the first housing 20 and the corresponding second housings 30 is formed with a guiding groove 204. The transmission component 26 which is strip-shaped and flexible is accommodated inside the guiding groove 204, and the transmission component 26 is connected between the movable pivot 60 and the operation component 25. The guiding groove 204 is curved, one end of the guiding groove 204 is relatively close to the movable pivot 60, and the other end of the guiding groove 204 is relatively close to the operation component 25. Specifically, since the transmission component 26 is flexible and elongated, and it is accommodated in the guiding groove 204, the guiding groove 204 may limit the shape change of the transmission component 26. Furthermore, the width of the guiding groove 204 is equal to or slightly larger than the outer diameter of the transmission component 26, preventing the transmission component 26 from deforming into a gathered form.

Optionally, in case that the operation component 25 moves away from the movable pivot 60, the operation component 25 pulls the movable pivot 60 through the transmission component 26, causing the movable pivot 60 to switch from the first state to the second state. In case that the operation component 25 moves toward the movable pivot 60, the operation component 25 pushes the movable pivot 60 through the transmission component 26, causing the movable pivot 60 to switch from the second state to the first state.

Optionally, the extending direction of one end of the guiding groove 204 is substantially aligned with the direction in which the movable pivot 60 exits the limiting hole 301. When the operation component 25 moves away from the movable pivot 60, the operation component 25 pulls the movable pivot 60 through the transmission component 26, causing the movable pivot 60 to switch from the second state to the first state. When the operation component 25 moves toward the movable pivot 60, the operation component 25 pushes the movable pivot 60 through the transmission component 26, causing the movable pivot 60 to switch from the first state to the second state.

Exemplarily, the front side 202 of the first housing 20 is partially recessed to form the guiding groove 204. The operation component 25 is slidably installed on the first housing 20.

Exemplarily, the transmission component 26 may be made of wire or other soft materials. It is understood that the transmission component 26 is not easily stretched or compressed in length but is easily deformed without changing its length.

Figure 18:
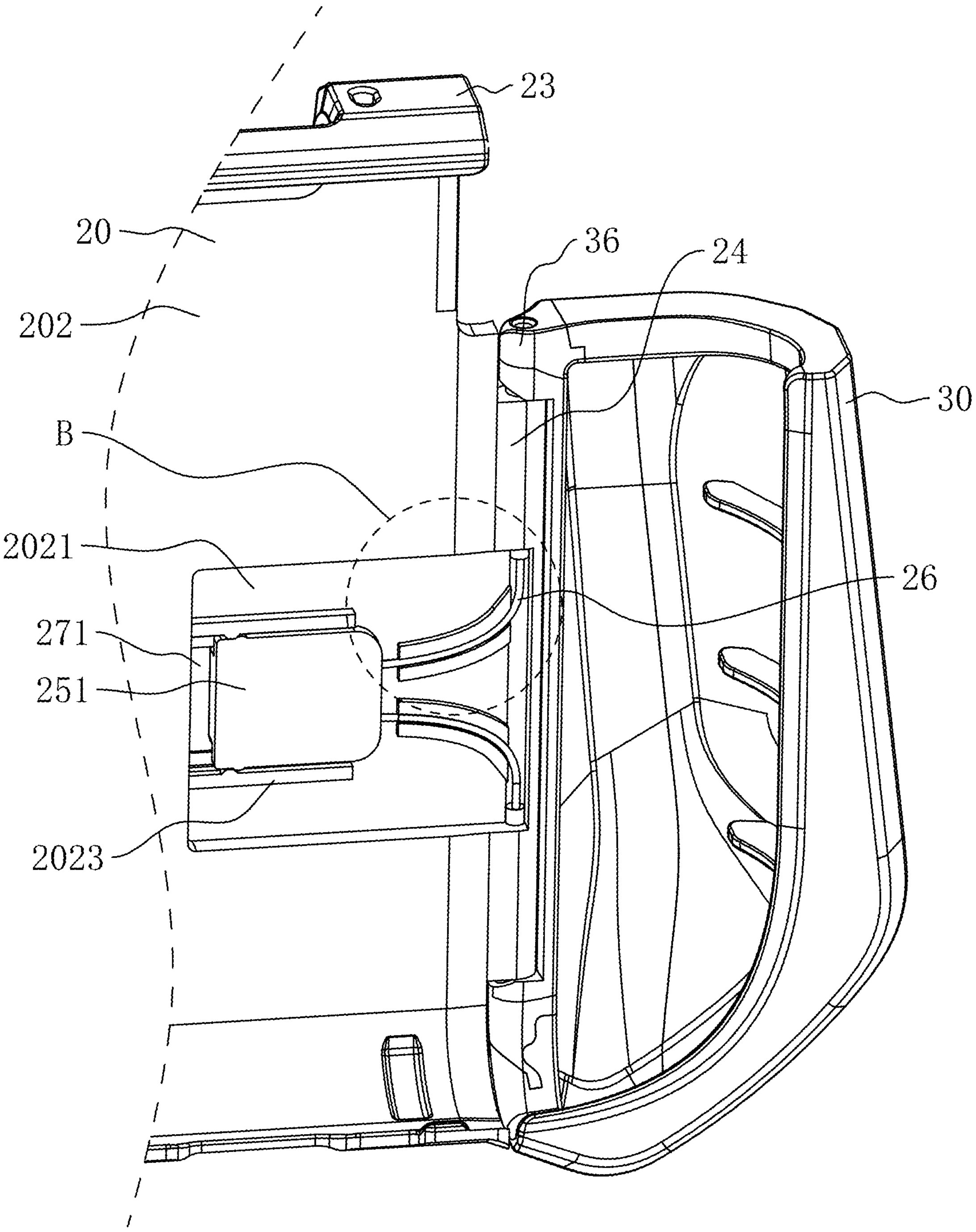
FIG. 18 is a schematic structural view of a part of the protective case for the game device in FIG. 16, wherein a cover plate is removed.
Figure 19A:
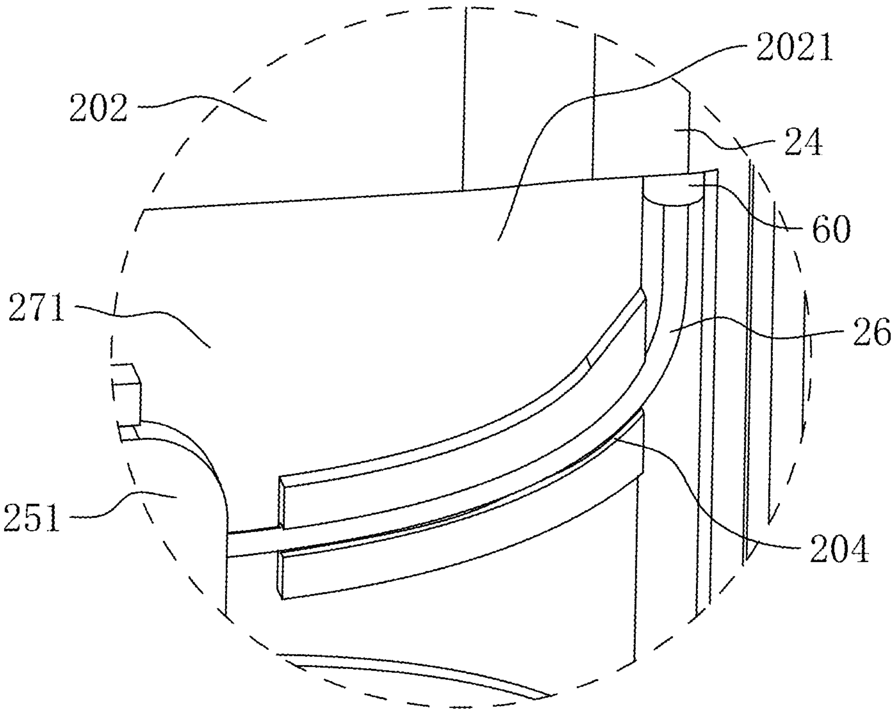
FIG. 19*a* is an enlarged view of a portion "B" of the protective case for the game device in FIG. 18.
Figure 19B:
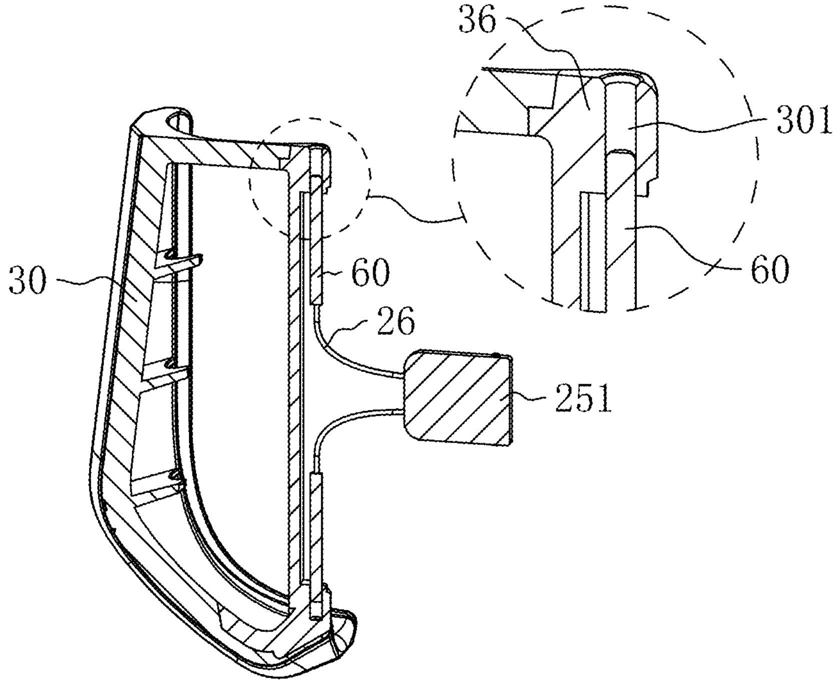
FIG. 19*b* is a cross-sectional view of the part of the protective case for the game device in FIG. 18, wherein the movable pivot is in a first state.

In some embodiments, as shown in FIG. 18 and FIG. 19*b*, the movable pivot 60 is arranged in pairs and includes a first movable pivot branch 60*a* and a second movable pivot branch 60*b*. The limiting hole 301 is arranged in pair and includes a first limiting hole part 301*a* and a second limiting hole part 301*b*. Similarly, the transmission component 26 is arranged in pair and includes a first transmission part 26*a* and a second transmission part 26*b*. The first movable pivot branch 60*a* and the second movable pivot branch 60*b* are directed toward the first limiting hole part 301*a* and the second limiting hole part 301*b* in opposite directions respectively. Specifically, since the first housing 20 and the second housing 30 are connected via a pair of movable pivots 60, and first movable pivot branch 60*a* and the second movable pivot branch 60*b* moves towards opposite directions, the rotation between the second housing 30 and the first housing 20 is more stable. It is understood that if one movable pivot 60 is inserted into its corresponding limiting hole 301 in the positive direction, the other movable pivot 60 is inserted into its corresponding limiting hole 301 in the reverse direction.

Optionally, the central axes of the first movable pivot branch 60*a* and the second movable pivot branch 60*b* are collinear. Optionally, the first movable pivot branch 60*a* and the second movable pivot branch 60*b* are slidably installed to the first housing 20. Optionally, the first movable pivot branch 60*a* and the second movable pivot branch 60*b* are slidably installed to the second housing 30.

Furthermore, as shown in FIG. 12 and FIG. 18, one transmission component 26 is mechanically coupled between the operation component 25 and a movable pivot 60, and the other transmission component 26 is mechanically coupled between the operation component 25 and another movable pivot 60. Specifically, the first transmission part 26*a* is mechanically coupled between the operation component 25 and the first movable pivot branch 60*a*, and the second transmission part 26*b* is mechanically coupled between the operation component 25 and the second movable pivot branch 60*b*. In this way, the states of both the first movable pivot branch 60*a* and the second movable pivot branch 60*b* are changed by controlling an operation component 25. Exemplarily, by controlling the operation component 25 to move from the fourth position to the third position, the first movable pivot branch 60*a* and the second movable pivot branch 60*b* may simultaneously be inserted into their corresponding first limiting hole part 301*a* and second limiting hole part 301*b*.

Optionally, as shown in FIG. 12 and FIG. 13, in case that the transmission component 26 is elastic, the operation component 25 is abutted between the two transmission components 26. In case that the operation component 25 moves from the fourth position to the third position, the deformation of the two transmission components 26 increases simultaneously, causing the two movable pivots 60 to be inserted into their corresponding limiting holes 301.

Figure 17:
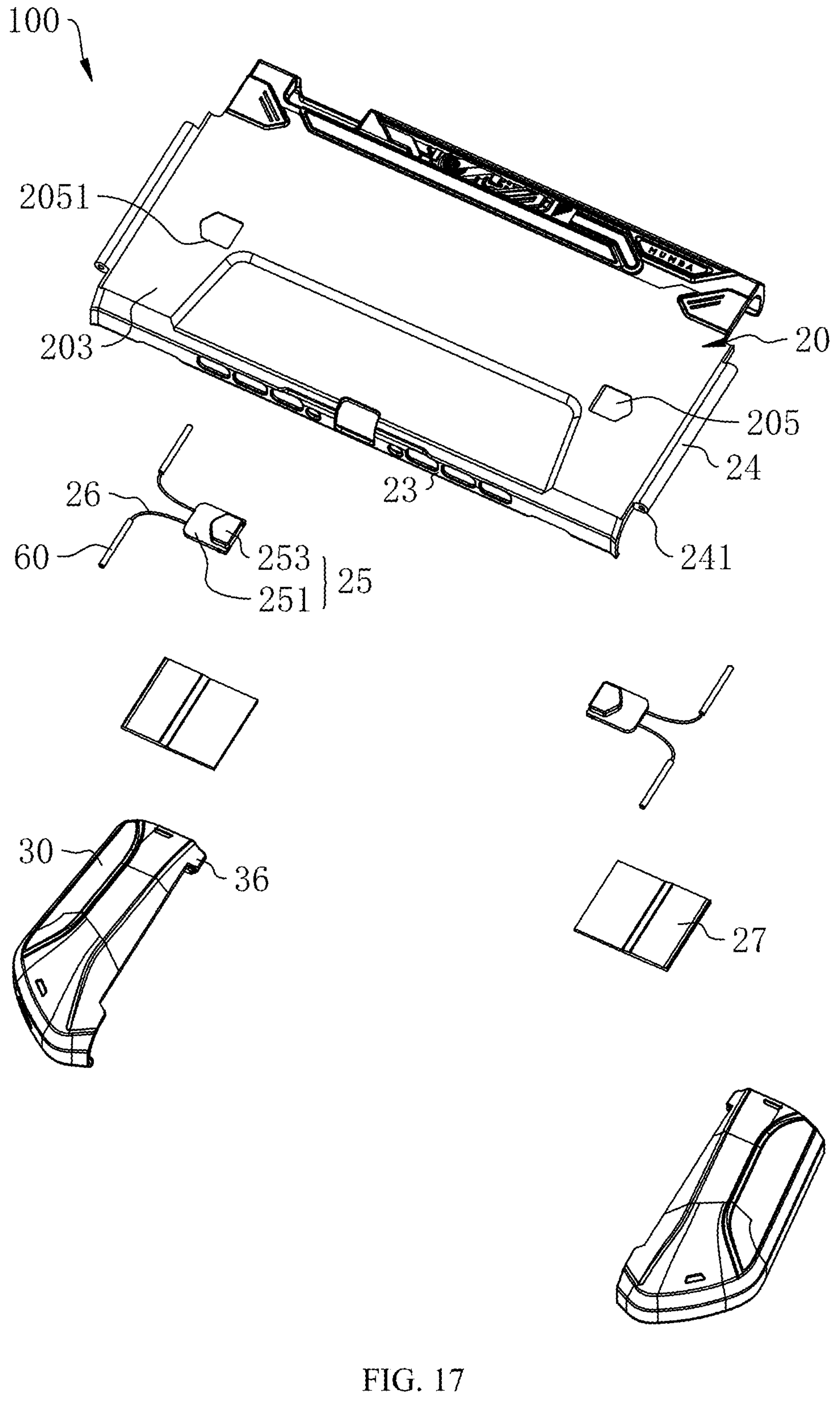
FIG. 17 is an exploded view of the protective case for the game device in FIG. 16.

Optionally, as shown in FIG. 17 and FIG. 18, in case that the transmission component 26 is flexible, the operation component 25 is connected to one end of the first transmission part 26*a* and one end of the second transmission part 26*b*, and the other end of the first transmission part 26*a* and the other end of the second transmission part 26*b* are connected to different movable pivots 60. When moving away from the movable pivots 60, the operation component 25 simultaneously exerts a pulling force on the two movable pivots 60. When moving toward the movable pivots 60, the operation component 25 simultaneously exerts a pushing force on the two movable pivots 60.

In other embodiments, the movable pivots 60, transmission components 26, and operation components 25 may be arranged in a one-to-one correspondence, meaning each movable pivot 60 is controlled by an independent operation component 25.

In some embodiments, the transmission components 26 and operation components 25 may be omitted, and the movable pivots 60 may be slid directly.

Figure 11:
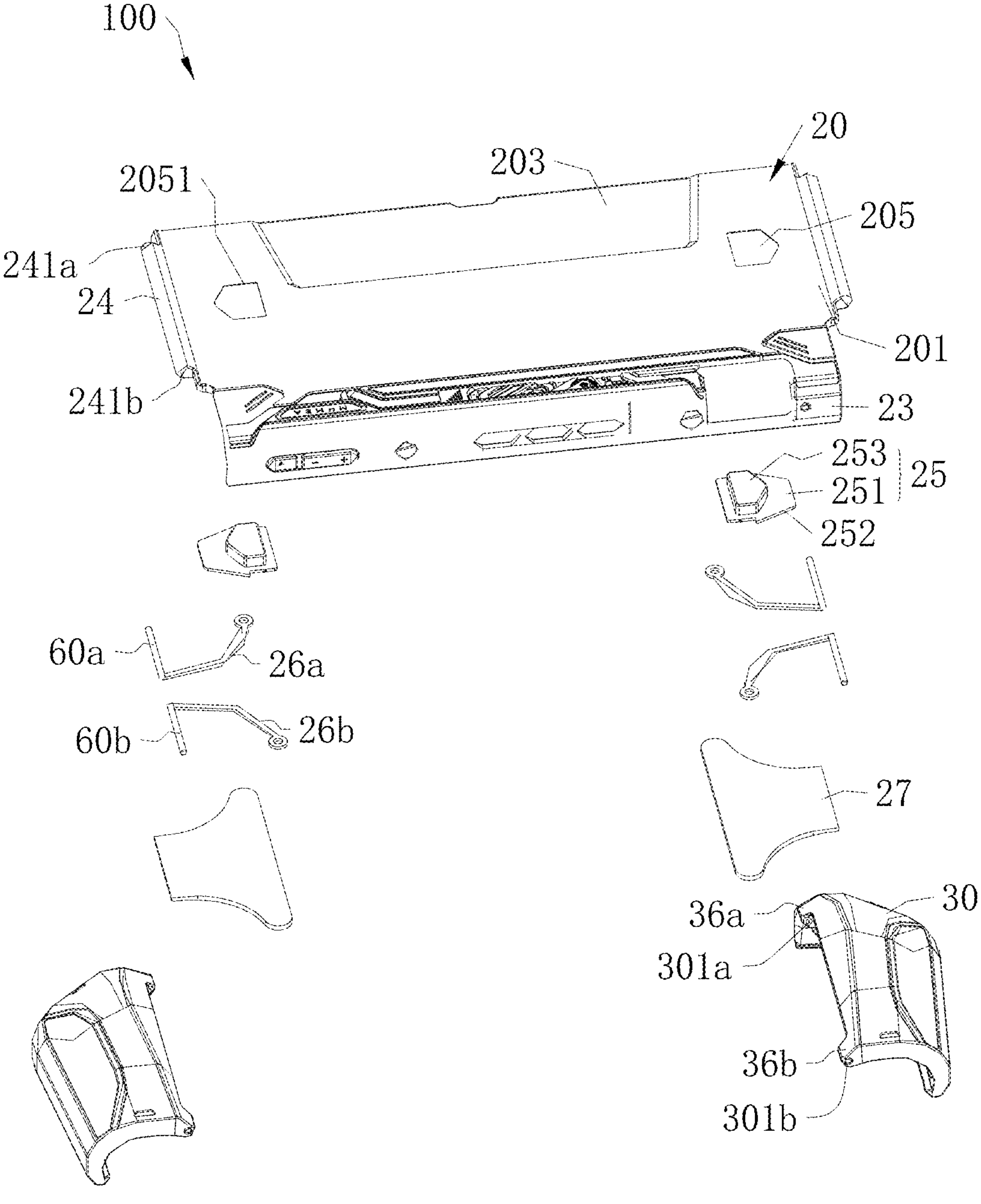
FIG. 11 is an exploded view of the protective case for the game device in FIG. 10*a;*

In some embodiments, as shown in FIG. 10*a*, FIG. 11, and FIG. 12, the protective case 100 for the game device further includes cover plates 27 connected to the first housing 20. Each cover plate 27 and the front side 202 of the first housing 20 are enclosed to form a limiting cavity 271. The transmission component 26 is accommodated in the limiting cavity 271. The operation component 25 is at least partially accommodated inside the limiting cavity 271. Specifically, since the operation component 25 and the transmission component 26 are housed inside the relatively enclosed limiting cavity 271, the movement of the operation component 25 and the transmission component 26 may be prevented from being affected.

Specifically, the direction extending along the cover plate 27 and the first housing 20 is approximately parallel to the direction extending along the front side 202 and the back side 203.

Exemplarily, the cover plate 27 is snapped onto the first housing 20. Optionally, as shown in FIG. 12, the front side 202 of the first housing 20 is partially recessed, and the cover plate 27 is housed in the recessed area 2021 of the front side 202 of the first housing 20. The outer surface of the cover plate 27 is flush with the other surfaces of the front side 202 of the first housing 20, improving the flatness of the front side 202. Optionally, the inner peripheral surface of the recessed area 2021 is stepped, and the opening area of the recessed area 2021 is larger than the bottom area of the recessed area 2021, so that the cover plate 27 maintains a gap from the bottom surface of the recessed area 2021, forming a space between the bottom surface of the recessed area 2021 and the cover plate 27 to accommodate the sliding portion 251 and the transmission component 26.

Exemplarily, the cover plate 27 is fixed to the first housing 20. Optionally, the cover plate 27 is adhesively attached to the first housing 20. Optionally, the cover plate 27 is integrally connected to the first housing 20.

In some embodiments, as shown in FIG. 10*b* and FIG. 11, a back side 203 of the first housing 20 is provided with two guide slots 205 that communicate with the limiting cavities 271. Each operation component 25 includes a sliding portion 251 slidably accommodated in the limiting cavity 271 and a protruding key portion 253 connected to the sliding portion 251. The protruding key portion 253 is slidably accommodated inside the guide slot 205. The sliding portion 251 is mechanically coupled to the transmission component 26. Specifically, the guide slot 205 is used to limit the sliding direction of the protruding key portion 253. Specifically, the guide slot 205 has a pair of opposite guide edges 2051 that are approximately parallel to the radial direction of the movable pivot 60. The protruding key portion 253 slides between the two guide edges 2051, enabling the operation component 25 to move away from or toward the movable pivot 60.

Optionally, as shown in FIG. 13, in case that the transmission component 26 is elastic, the sliding portion 251 abuts against the edge of the transmission component 26. Furthermore, the sliding portion 251 has two opposite inclined edges 252. The sliding portion 251 is slidably arranged between edges of the first transmission part 26*a* and the second transmission part 26*b*, with the inclined edges 252 pressed against edges of the first transmission part 26*a* and the second transmission part 26*b*. In the direction away from the movable pivot 60, the distance between the two inclined edges 252 gradually increases, thereby causing greater deformation of the two transmission components 26, as the operation component 25 moves closer to the movable pivot 60, thereby allowing the movable pivot 60 to be inserted more deeply into the limiting hole 301.

Figure 14:
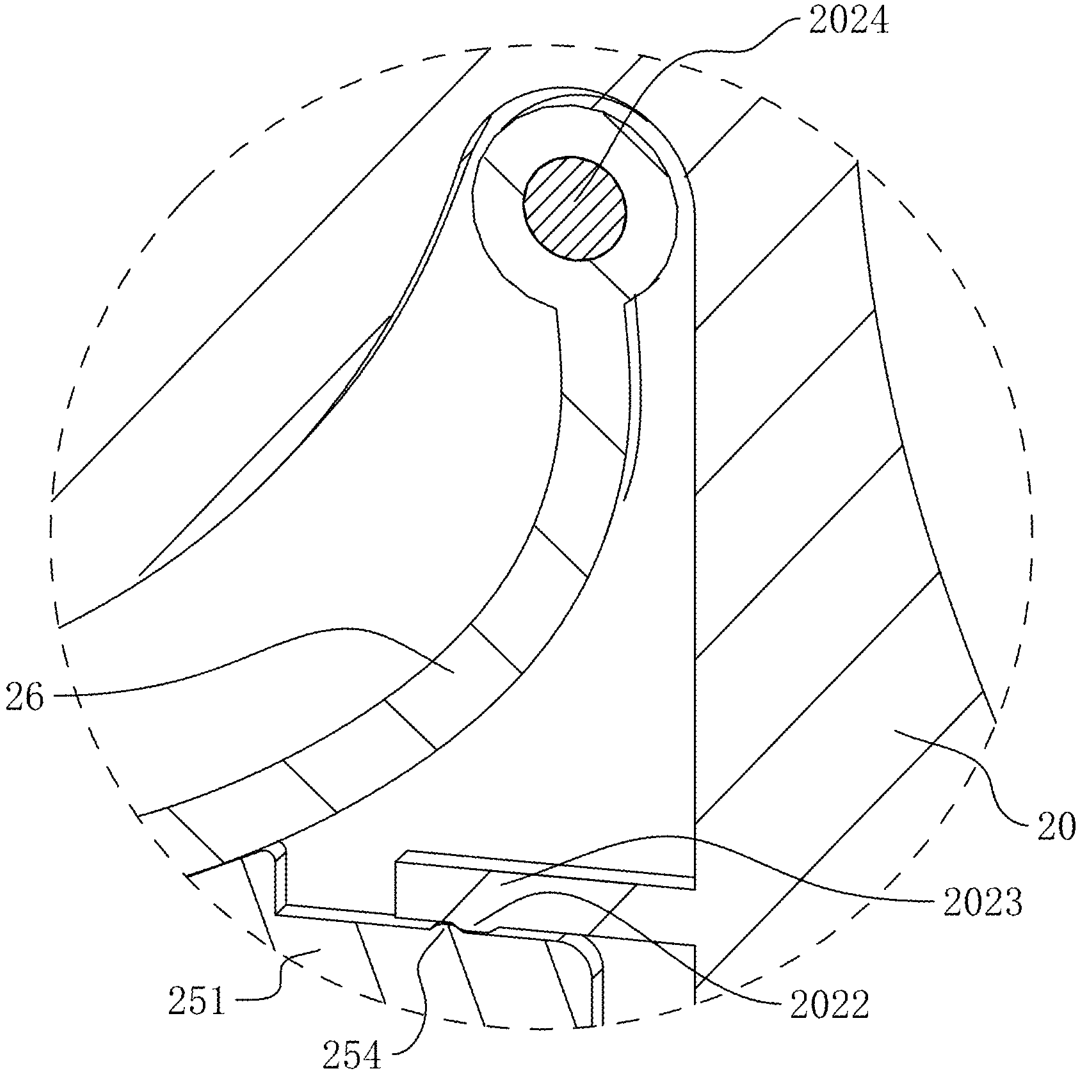
FIG. 14 is an enlarged view of a portion "A" of the protective case for the game device in FIG. 13.

Optionally, as shown in FIG. 14, the operation component 25 also includes a first locking portion 254, and the first housing 20 is provided with a second locking portion 2022. An interference fit is formed between the first locking portion 254 and the second locking portion 2022, thereby limiting the operation component 25 in the third position. The user needs to overcome the squeezing force between the first locking portion 254 and the second locking portion 2022 to slide the operation component 25 to the fourth position, ensuring that the movable pivot 60 is stably inserted into the limiting hole 301. Optionally, the first locking portion 254 is connected to the edge of the sliding portion 251. Alternatively, the operation component 25 may be stabilized at the third position using an elastic structure.

Optionally, in the case where the operation component 25 and transmission component 26 are omitted, a third locking portion may be provided on the movable pivot 60, and a fourth locking portion may be provided on the first housing 20. The third and fourth locking portions form an interference fit, thereby limiting the movable pivot 60 in the first state.

Optionally, in case that the transmission component 26 is flexible, the sliding portion 251 is connected to one end of the two transmission components 26.

Optionally, as shown in FIG. 12 to FIG. 14, the front side 202 of the first housing 20 is formed with two elongated limiting portions 2023, which are oppositely arranged and spaced apart. The sliding portion 251 is slidably arranged between the two elongated limiting portions 2023, with the distance between the two elongated limiting portions 2023 corresponding to the size of the sliding portion 251, thereby allowing the elongated limiting portions 2023 to define the sliding direction of the sliding portion 251. It may be understood that the sliding direction of the sliding portion 251 relative to the first housing 20 is approximately perpendicular to the direction along the two elongated limiting portions 2023. Optionally, the elongated limiting portions 2023 are housed in the recessed area 2021. Furthermore, the elongated limiting portions 2023 are arranged to protrude relative to the bottom surface of the recessed area 2021, and the elongated limiting portions 2023 abut against the cover plate 27, thereby keeping a gap between the bottom surface of the recessed area 2021 and the cover plate 27, and forming a space to accommodate the sliding portion 251 and transmission component 26 between the bottom surface of the recessed area 2021 and the cover plate 27. Optionally, the second locking portion 2022 is connected to the inner side of the elongated limiting portion 2023.

Optionally, as shown in FIG. 12 to FIG. 14, the front side 202 of the first housing 20 is formed with a boss 2024. In case that the transmission component 26 is elastic, the boss 2024 is inserted into the other end of the transmission component 26, thereby stabilizing the other end of the transmission component 26 relative to the first housing 20, so that the deformation of the transmission component 26 may cause the movement of the movable pivot 60.

In some embodiments, as shown in FIG. 11 to FIG. 13, the movable pivot 60 is arranged in pairs and includes a first movable pivot branch 60*a* and a second movable pivot branch 60*b*. The limiting hole 301 is arranged in pair and includes a first limiting hole part 301*a* and a second limiting hole part 301*b*. the first housing 20 is formed with a guide tube 24 on the lateral side 201. The guide tube 24 has two ends that are opposite to each other, and the two ends of the guide tube 24 are respectively provided with a first port 241*a* and a second port 241*b*. The first movable pivot branch 60*a* and the second movable pivot branch 60*b* are respectively slidably inserted into the guide tube 24. The second housing 30 is formed with a first engaging part 36*a* provided with the first limiting hole part 301*a* and a second engaging part 36*b* provided with the second limiting hole part 301*b*, and the first engaging part 36*a* and the second engaging part 36*b* are spaced apart. In case that the guide tube 24 is positioned between the first engaging part 36*a* and the second engaging part 36*b*, the first port 241*a* and the second port 241*b* at both ends of the guide tube 24 are oppositely arranged with the first limiting hole 301*a* in the first engaging part 36*a* and the second limiting hole 301*b* in the second engaging part 36*b*. Specifically, the guide tube 24 defines the sliding directions of the first movable pivot branch 60*a* and the second movable pivot branch 60*b*. The guide tube 24 is located between the two engaging portions 36, and the ports 241 at both ends of the guide tube 24 are oppositely arranged with the limiting holes 301 in the engaging portions 36. The movable pivot branches 60 will just be inserted into the limiting holes 301 in the engaging portions 36 when extending from the ports 241 of the guide tube 24, achieving the rotation of the second housing 30 relative to the first housing 20.

Optionally, the length of the guide tube 24 is approximately equal to the spacing between the two engaging portions 36, so that the relative movement between the second housing 30 and the first housing 20 along the axial direction of the movable pivot 60 may be limited, thereby preventing the movable pivot 60 from being compressed by the engaging portions 36 and retracting back into the guide tube 24.

Optionally, the internal space of the guide tube 24 is connected to the limiting cavity 271, so that the transmission component 26 may extend from the limiting cavity 271 into the guide tube 24 and connect with the movable pivot 60.

In other embodiments, the two movable pivots 60 may respectively be slidably inserted into the two engaging portions 36, and the two ends of the guide tube 24 may be provided with limiting holes 301.

In further embodiments, the second housing 30 may form a guide tube 24 on the lateral side 201, the first housing 20 may be formed with two engaging portions 36. Each of the engaging portions 36 is provided with a limiting hole 301, and the two engaging portions 36 are spaced apart.

The above is only a preferred embodiment of the present disclosure. It should be noted that for those skilled in the art, various improvements and modifications can be made without departing from the principles of the present disclosure. These improvements and modifications should also be considered within the scope of protection of the present disclosure.

What is claimed is:

1. A protective case for a game device, wherein the game device comprises a main body and two handle controllers respectively and detachably connected to two sides of the main body, the protective case comprising:

a first housing configured for accommodating the main body of the game device, the first housing having two opposite lateral sides along a lateral direction of the first housing; and two second housings configured for accommodating the two handle controllers respectively, the two second housings being rotatably connected to the two lateral sides of the first housing respectively, each second housing having a lateral wall on a side away from the first housing, wherein the first housing and the two second housing are separate components, and each second housing is rotatably connected to a corresponding lateral side of the first housing though a pivot; and wherein each second housing is rotatable relative to the first housing between a first position in which the lateral wall of the second housing is engaged with a side edge of a corresponding handle controller, preventing the corresponding handle controller from moving away from the main body along the lateral direction; and a second position in which the lateral wall of the second housing is disengaged with the side edge of the corresponding handle controller, allowing the corresponding handle controller to be detached from the main body along the lateral direction.

2. The protective case for the game device according to claim 1, wherein the first housing comprises a back plate and two main side walls connected to the back plate, the two main side walls are bent relative to the back plate in a front direction, and the two main side walls are spaced apart and positioned oppositely.

3. The protective case for the game device according to claim 1, wherein each second housing further comprises a back wall rotatably connected to the first housing, the lateral wall is connected to and is bent relative to the back wall, and wherein in the first position, the lateral wall is at least partially positioned opposite to one of the two lateral sides of the first housing.

4. The protective case for the game device according to claim 3, wherein each second housing comprises a flange provided on an edge of the lateral wall away from the back wall, and the flange is bent relative to the lateral wall towards the first housing.

5. The protective case for the game device according to claim 3, wherein each second housing comprises a plurality of reinforcing ribs, the plurality of reinforcing ribs extend from the back wall to the lateral wall, and every two adjacent reinforcing ribs are spaced apart.

6. The protective case for the game device according to claim 5, wherein each reinforcing rib has an arcuate edge on a side away from the back wall and the lateral wall.

7. The protective case for the game device according to claim 1, wherein each pivot is a movable pivot, wherein the first housing and each second housing is rotatably connected with each other by a corresponding movable pivot therebetween, the corresponding movable pivot is slidably mounted on one of the first housing and a corresponding second housing, and an other one of the first housing and the corresponding second housing is provided with a limiting hole configured for accommodating the corresponding movable pivot, and wherein for each movable pivot, the movable pivot has a first state in which at least a portion of the movable pivot is engaged in a corresponding limiting hole and a second state in which the movable pivot is disengaged from the corresponding limiting hole.

8. The protective case for the game device according to claim 7, further comprising two operation components and two transmission components, wherein each transmission component is mechanically coupled between a corresponding movable pivot and a corresponding operation component, each operation component and the connected transmission component are slidably mounted on one of the first housing and the corresponding second housing.

9. The protective case for the game device according to claim 8, wherein the transmission components are elastic, and wherein for each transmission component, one end of the transmission component is connected to the corresponding movable pivot, an other end of the transmission component is slidably positioned in the one of the first housing and the corresponding second housing, and the operation component is fixedly connected to the transmission component and movable relative to the one of the first housing and the corresponding second housing.

10. The protective case for the game device according to claim 8, wherein each movable pivot comprises a first movable pivot branch and a second movable pivot branch, the limiting hole comprises a first limiting hole part and a second limiting hole part, and the transmission component comprises a first transmission part and a second transmission part, and wherein the first movable pivot branch and the second movable pivot branch are directed towards the first limiting hole part and the second limiting hole part in opposite directions respectively, the first transmission part is mechanically coupled between the operation component and the first movable pivot branch, and the second transmission part is mechanically coupled between the operation component and the second movable pivot branch.

11. The protective case for the game device according to claim 8, further comprising two cover plates connected to the first housing, each cover plate and a front side of the first housing are enclosed to form a limiting cavity, each transmission component is accommodated inside a corresponding limiting cavity, and each operation component is at least partially accommodated inside the corresponding limiting cavity.

12. The protective case for the game device according to claim 11, wherein a back side of the first housing is formed with two guide slots communicated with the limiting cavities respectively, each operation component comprises a sliding portion slidably accommodated inside the corresponding limiting cavity and a protruding key portion connected to the sliding portion, the protruding key portion is slidably accommodated inside a corresponding guide slot, and the sliding portion is mechanically coupled to a corresponding transmission component.

13. The protective case for the game device according to claim 7, wherein each movable pivot comprises a first movable pivot branch and a second movable pivot branch, and each limiting hole comprises a first limiting hole part and a second limiting hole part, wherein each of the two lateral sides of the first housing is provided with a guide tube, the guide tube has two opposite ends which are provided with a first port and a second port respectively, the first movable pivot branch and the second movable pivot branch are slidably inserted into the first port and the second port of the guide tube respectively, the corresponding second housing is formed with a first engaging part provided with the first limiting hole part and a second engaging part provided with the second limiting hole part, the first engaging part and the second engaging part are spaced apart, wherein when the guide tube is positioned between the first engaging part and the second engaging part, the first port and the second port of the guide tube are aligned with the first limiting hole part and the second limiting hole part respectively.

14. The protective case for the game device according to claim 1, wherein one of the first housing and a corresponding second housing is rotatabe around a central axis of a corresponding pivot.

15. A protective case for a game device, wherein the game device comprises a main body and two handle controllers respectively and detachably connected to two sides of the main body, the protective case comprising:

a first housing configured for accommodating the main body of the game device, the first housing having two opposite lateral sides along a lateral direction of the first housing; and two second housings configured for accommodating the two handle controllers respectively, the two second housings being rotatably connected to the two lateral sides of the first housing respectively, each second housing having a lateral wall on a side away from the first housing, wherein each second housing is rotatable relative to the first housing between a first position in which the lateral wall of the second housing is engaged with a side edge of a corresponding handle controller, preventing the corresponding handle controller from moving away from the main body along the lateral direction; and a second position in which the lateral wall of the second housing is disengaged with the side edge of the corresponding handle controller, allowing the corresponding handle controller to be detached from the main body along the lateral direction;

wherein each second housing further comprises a back wall rotatably connected to the first housing, the lateral wall is connected to and is bent relative to the back wall, and wherein in the first position, the lateral wall is at least partially positioned opposite to one of the two lateral sides of the first housing; and wherein each second housing comprises a plurality of reinforcing ribs, the plurality of reinforcing ribs extend from the back wall to the lateral wall, and every two adjacent reinforcing ribs are spaced apart.

16. A protective case for a game device, wherein the game device comprises a main body and two handle controllers respectively and detachably connected to two sides of the main body, the protective case comprising:

a first housing configured for accommodating the main body of the game device, the first housing having two opposite lateral sides along a lateral direction of the first housing; and two second housings configured for accommodating the two handle controllers respectively, the two second housings being rotatably connected to the two lateral sides of the first housing respectively, each second housing having a lateral wall on a side away from the first housing, wherein each second housing is rotatable relative to the first housing between a first position in which the lateral wall of the second housing is engaged with a side edge of a corresponding handle controller, preventing the corresponding handle controller from moving away from the main body along the lateral direction; and a second position in which the lateral wall of the second housing is disengaged with the side edge of the corresponding handle controller, allowing the corresponding handle controller to be detached from the main body along the lateral direction;

wherein the protective case for the game device further comprises two movable pivots, wherein the first housing and each second housing is rotatably connected with each other by a corresponding movable pivot therebetween, the corresponding movable pivot is slidably mounted on one of the first housing and a corresponding second housing, and an other one of the first housing and the corresponding second housing is provided with a limiting hole configured for accommodating the corresponding movable pivot, and wherein for each movable pivot, the movable pivot has a first state in which at least a portion of the movable pivot is engaged in a corresponding limiting hole and a second state in which the movable pivot is disengaged from the corresponding limiting hole.

* * * * *